(12) United States Patent
Sadiq et al.

(10) Patent No.: US 11,317,414 B2
(45) Date of Patent: Apr. 26, 2022

(54) EXCHANGING LOCATION INFORMATION OF A BASE STATION THAT IS ASSOCIATED WITH A PLURALITY OF DIFFERENT TRANSMISSION POINT LOCATIONS

(71) Applicant: QUALCOMM Incorporated, San Diego, CA (US)

(72) Inventors: Bilal Sadiq, Basking Ridge, NJ (US); Junyi Li, Chester, NJ (US); Pavan Kumar Vitthaladevuni, San Diego, CA (US); Joseph Binamira Soriaga, San Diego, CA (US); Alexandros Manolakos, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/412,110

(22) Filed: May 14, 2019

(65) Prior Publication Data
US 2019/0373594 A1  Dec. 5, 2019

(30) Foreign Application Priority Data
Jun. 5, 2018  (GR) .............................. 20180100242

(51) Int. Cl.
*H04W 4/02* (2018.01)
*H04W 72/04* (2009.01)

(52) U.S. Cl.
CPC ....... *H04W 72/048* (2013.01); *H04W 72/042* (2013.01); *H04W 72/046* (2013.01)

(58) Field of Classification Search
CPC . H04W 16/28; H04W 24/04; H04W 36/0016; H04W 36/0033; H04W 64/00;
(Continued)

(56) References Cited

U.S. PATENT DOCUMENTS

2005/0020309 A1* 1/2005 Moeglein ............... G01S 19/46
455/561
2006/0009235 A1* 1/2006 Sheynblat ................ G01S 5/06
455/456.1
(Continued)

FOREIGN PATENT DOCUMENTS

CN  107690787 A  2/2018
WO  2011139201 A1  11/2011
(Continued)

OTHER PUBLICATIONS

International Search Report and Written Opinion—PCT/US2019/032509—ISA/EPO—dated Jul. 26, 2019.

*Primary Examiner* — Quan M Hua
(74) *Attorney, Agent, or Firm* — Thien T. Nguyen

(57) ABSTRACT

In an embodiment, a network entity (e.g., a base station, a location server, etc.) transmits, to a user equipment (UE), at least one base station almanac (BSA) message that indicates (i) a set of transmission point locations associated with at least one base station, the set of transmission point locations including at least one transmission point location of a base station that is based upon a plurality of different transmission point locations associated with the base station, and (ii) a mapping of each of a plurality of beams to the at least one transmission point location. The UE receives the transmitted at least one BSA message.

30 Claims, 14 Drawing Sheets

(58) Field of Classification Search
CPC ... H04W 88/08; H04W 4/025; H04W 28/021; H04W 28/0215; H04W 68/005; H04W 72/085; H04W 4/029; H04W 72/04; H04W 24/10; H04W 24/00; H04W 4/02; H04W 24/08; H04W 72/08; H04W 56/00; H04W 76/27; H04W 12/00; H04W 12/04; H04W 12/06; H04W 4/20; H04W 48/10; H04W 72/00; H04W 76/20; H04W 8/24; H04W 80/02; H04W 84/04; H04W 88/02; H04W 88/04; H04L 5/00; H04L 29/12
See application file for complete search history.

(56) References Cited

U.S. PATENT DOCUMENTS

| | | | | |
|---|---|---|---|---|
| 2006/0129607 | A1* | 6/2006 | Sairo | G01S 19/42 |
| 2008/0026733 | A1* | 1/2008 | Jaatinen | G01S 5/02 |
| | | | | 455/414.2 |
| 2011/0039576 | A1* | 2/2011 | Prakash | H04W 64/00 |
| | | | | 455/456.1 |
| 2011/0124347 | A1* | 5/2011 | Chen | H04W 64/00 |
| | | | | 455/456.1 |
| 2014/0162704 | A1 | 6/2014 | Choi et al. | |
| 2015/0030157 | A1* | 1/2015 | Segev | G01S 5/0027 |
| | | | | 380/270 |
| 2019/0097712 | A1* | 3/2019 | Singh | H04B 7/08 |

FOREIGN PATENT DOCUMENTS

| | | | |
|---|---|---|---|
| WO | 2016162779 | A1 | 10/2016 |
| WO | 2016196431 | A1 | 12/2016 |

\* cited by examiner

EXCHANGING LOCATION INFORMATION OF A BASE STATION THAT IS ASSOCIATED WITH A PLURALITY OF DIFFERENT TRANSMISSION POINT LOCATIONS

CROSS-REFERENCE TO RELATED APPLICATION

The present application for patent claims priority under 35 U.S.C. § 119 to Greek Patent Application No. 20180100242 entitled, "EXCHANGING LOCATION INFORMATION OF A BASE STATION THAT IS ASSOCIATED WITH A PLURALITY OF DIFFERENT TRANSMISSION POINT LOCATIONS", filed with the Greek Patent and Trademark Office on Jun. 5, 2018, and assigned to the assignee hereof and hereby expressly incorporated herein by reference in its entirety.

TECHNICAL FIELD

Various aspects described herein generally relate to wireless communication systems, and more particularly, to exchanging location information of a base station that is associated with a plurality of different transmission point locations.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Some wireless communication networks, such as 5G, support operation at very high and even extremely-high frequency (EHF) bands, such as millimeter wave (mmW) frequency bands (generally, wavelengths of 1 mm to 10 mm, or 30 to 300 GHz). These extremely high frequencies may support very high throughput such as up to six gigabits per second (Gbps). One of the challenges for wireless communication at very high or extremely high frequencies, however, is that a significant propagation loss may occur due to the high frequency. As the frequency increases, the wavelength may decrease, and the propagation loss may increase as well. At mmW frequency bands, the propagation loss may be severe. For example, the propagation loss may be on the order of 22 to 27 dB, relative to that observed in either the 2.4 GHz, or 5 GHz bands.

Propagation loss is also an issue in Multiple Input-Multiple Output (MIMO) and massive MIMO systems in any band. The term MIMO as used herein will generally refer to both MIMO and massive MIMO. MIMO is a method for multiplying the capacity of a radio link by using multiple transmit and receive antennas to exploit multipath propagation. Multipath propagation occurs because radio frequency (RF) signals not only travel by the shortest path between the transmitter and receiver, which may be a line of sight (LOS) path, but also over a number of other paths as they spread out from the transmitter and reflect off other objects such as hills, buildings, water, and the like on their way to the receiver. A transmitter in a MIMO system includes multiple antennas and takes advantage of multipath propagation by directing these antennas to each transmit the same RF signals on the same radio channel to a receiver. The receiver is also equipped with multiple antennas tuned to the radio channel that can detect the RF signals sent by the transmitter. As the RF signals arrive at the receiver (some RF signals may be delayed due to the multipath propagation), the receiver can combine them into a single RF signal. Because the transmitter sends each RF signal at a lower power level than it would send a single RF signal, propagation loss is also an issue in a MIMO system.

To address propagation loss issues in mmW band systems and MIMO systems, transmitters may use beamforming to extend RF signal coverage. In particular, transmit beamforming is a technique for emitting an RF signal in a specific direction, whereas receive beamforming is a technique used to increase receive sensitivity of RF signals that arrive at a receiver along a specific direction. Transmit beamforming and receive beamforming may be used in conjunction with each other or separately, and references to "beamforming" may hereinafter refer to transmit beamforming, receive beamforming, or both. Traditionally, when a transmitter broadcasts an RF signal, it broadcasts the RF signal in nearly all directions determined by the fixed antenna pattern or radiation pattern of the antenna. With beamforming, the transmitter determines where a given receiver is located relative to the transmitter and projects a stronger downlink RF signal in that specific direction, thereby providing a faster (in terms of data rate) and stronger RF signal for the receiver. To change the directionality of the RF signal when transmitting, a transmitter can control the phase and relative amplitude of the RF signal broadcasted by each antenna. For example, a transmitter may use an array of antennas (also referred to as a "phased array" or an "antenna array") that creates a beam of RF waves that can be "steered" to point in different directions, without actually moving the antennas. Specifically, the RF current is fed to the individual antennas with the correct phase relationship so that the radio waves from the separate antennas add together to increase the radiation in a desired direction, while cancelling the radio waves from the separate antennas to suppress radiation in undesired directions.

To support position estimations in terrestrial wireless networks, a mobile device can be configured to measure and report the observed time difference of arrival (OTDOA) or reference signal timing difference (RSTD) between reference RF signals received from two or more network nodes (e.g., different base stations or different transmission points (e.g., antennas) belonging to the same base station).

Where a transmitter uses beamforming to transmit RF signals, the beams of interest for data communication between the transmitter and receiver will be the beams carrying RF signals having the highest received signal strength (or highest received Signal to Noise plus Interference Ratio (SINR), for example, in the presence of a directional interfering signal). However, the receiver's ability to perform certain tasks may suffer when the receiver relies upon the beam with the highest received signal strength. For example, in a scenario where the beam with the highest received signal strength travels over a non-LOS (NLOS) path that is longer than the shortest path (i.e., a LOS path or a shortest NLOS path), the RF signals may arrive later than RF signal(s) received over the shortest path due to propagation delay. Accordingly, if the receiver is performing a task that requires precise timing measurements, and the beam with the highest received signal strength is affected by longer propagation delay, then the beam with the highest received signal strength may not be optimal for the task at hand.

SUMMARY

An embodiment is directed to a method of operating a user equipment (UE), comprising receiving, from a network entity, at least one base station almanac (BSA) message that indicates (i) a set of transmission point locations associated with at least one base station, the set of transmission point locations including at least one transmission point location of a base station that is based upon a plurality of different transmission point locations associated with the base station, and (ii) a mapping of each of a plurality of beams to the at least one transmission point location.

Another embodiment is directed to a method of operating a network entity, comprising transmitting, to a user equipment (UE), at least one base station almanac (BSA) message that indicates (i) a set of transmission point locations associated with at least one base station, the set of transmission point locations including at least one transmission point location of a base station that is based upon a plurality of different transmission point locations associated with the base station, and (ii) a mapping of each of a plurality of beams to the at least one transmission point location.

Another embodiment is directed to a user equipment (UE), comprising a memory, and means for receiving, from a network entity, at least one base station almanac (BSA) message that indicates (i) a set of transmission point locations associated with at least one base station, the set of transmission point locations including at least one transmission point location of a base station that is based upon a plurality of different transmission point locations associated with the base station, and (ii) a mapping of each of a plurality of beams to the at least one transmission point location.

Another embodiment is directed to a network entity, comprising a memory, and means for transmitting, to a user equipment (UE), at least one base station almanac (BSA) message that indicates (i) a set of transmission point locations associated with the at least one base station, the set of transmission point locations including at least one transmission point location of a base station that is based upon a plurality of different transmission point locations associated with the base station, and (ii) a mapping of each of a plurality of beams to the at least one transmission point location.

Another embodiment is directed to a user equipment (UE), comprising a memory, at least one transceiver, and at least one processor coupled to the memory and the at least one transceiver and configured to receive, from a network entity, at least one base station almanac (BSA) message that indicates (i) a set of transmission point locations associated with at least one base station, the set of transmission point locations including at least one transmission point location of a base station that is based upon a plurality of different transmission point locations associated with the base station, and (ii) a mapping of each of a plurality of beams to the at least one transmission point location.

Another embodiment is directed to a network entity, comprising a memory, at least one communication interface, and at least one processor coupled to the memory and the at least one communication interface and configured to transmit, to a user equipment (UE), at least one base station almanac (BSA) message that indicates (i) a set of transmission point locations associated with at least one base station, the set of transmission point locations including at least one transmission point location of a base station that is based upon a plurality of different transmission point locations associated with the base station, and (ii) a mapping of each of a plurality of beams to the at least one transmission point location.

Another embodiment is directed to a non-transitory computer-readable medium containing instructions stored thereon, which, when executed by a user equipment (UE), cause the UE to perform operations, the instructions comprising at least one instruction to cause the UE to receive, from a network entity, at least one base station almanac (BSA) message that indicates (i) a set of transmission point locations associated with at least one base station, the set of transmission point locations including at least one transmission point location of a base station that is based upon a plurality of different transmission point locations associated with the base station, and (ii) a mapping of each of a plurality of beams to the at least one transmission point location.

Another embodiment is directed to a non-transitory computer-readable medium containing instructions stored thereon, which, when executed by a network entity, cause the network entity to perform operations, the instructions comprising at least one instruction to cause the network entity to transmit, to a user equipment (UE), at least one base station almanac (BSA) message that indicates (i) a set of transmission point locations associated with at least one base station, the set of transmission point locations including at least one transmission point location of a base station that is based upon a plurality of different transmission point locations associated with the base station, and (ii) a mapping of each of a plurality of beams to the at least one transmission point location.

BRIEF DESCRIPTION OF THE DRAWINGS

A more complete appreciation of the various aspects described herein and many attendant advantages thereof will be readily obtained as the same becomes better understood by reference to the following detailed description when considered in connection with the accompanying drawings which are presented solely for illustration and not limitation, and in which.

DETAILED DESCRIPTION

Figure 1:
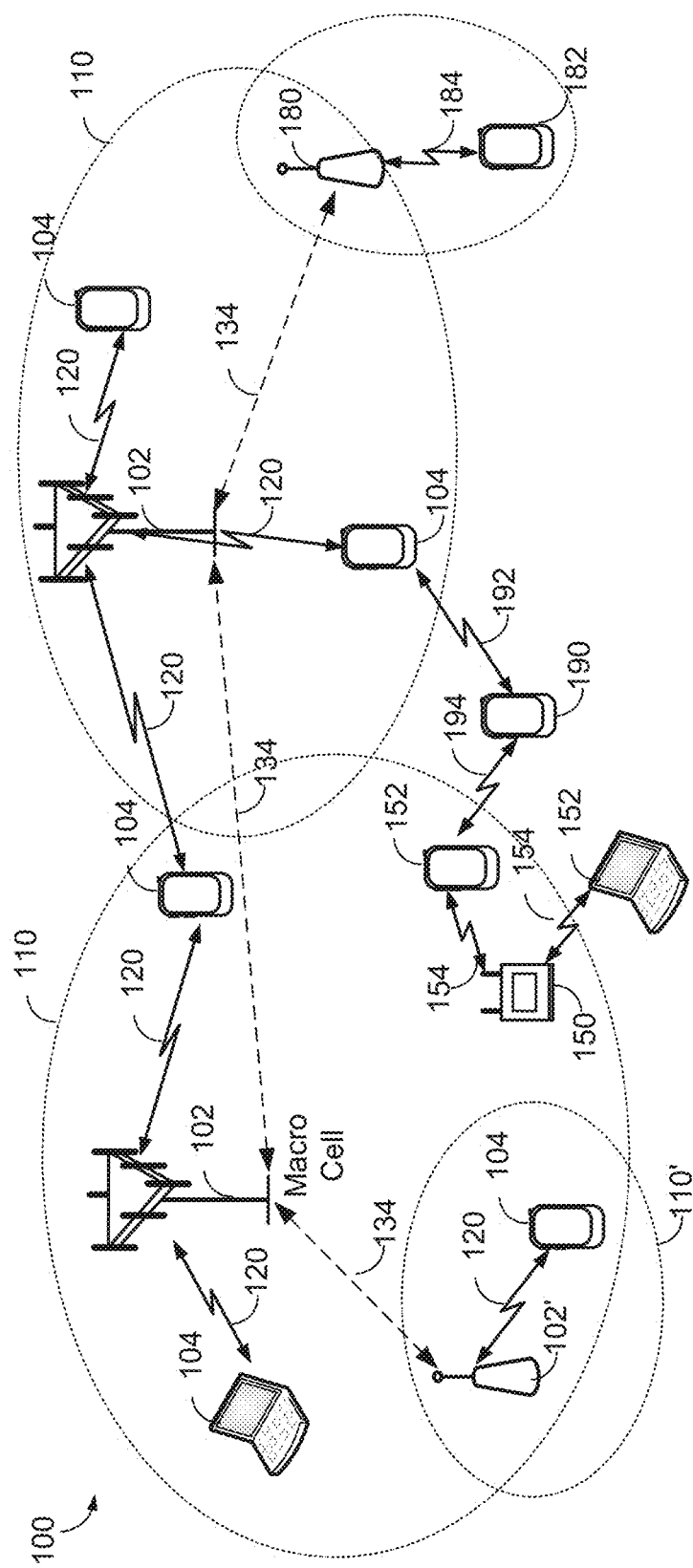
FIG. 1 illustrates an exemplary wireless communications system, according to various aspects.

Various aspects described herein generally relate to exchanging location information of a base station that is associated with a plurality of different transmission point locations. In an embodiment, a user equipment (UE) receives, from a network entity (e.g., a base station, a server, etc.), at least one base station almanac (BSA) message that indicates (i) a set of transmission point locations associated with at least one base station, the set of transmission point locations including at least one transmission point location of a base station that is based upon a plurality of different transmission point locations associated with the base station, and (ii) a mapping of each of a plurality of beams to the at least one transmission point location. The UE receives, from the base station, the plurality of beams in accordance with the mapping. The UE then estimates a position of the UE based at least in part upon (i) one or more measurements performed by the UE on one or more of the plurality of beams and (ii) the at least one transmission point location to which the one or more beams are mapped.

These and other aspects are disclosed in the following description and related drawings to show specific examples relating to exemplary aspects. Alternate aspects will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects disclosed herein.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

The terminology used herein describes particular aspects only and should not be construed to limit any aspects disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the terms "user equipment" (or "UE"), "user device," "user terminal," "client device," "communication device," "wireless device," "wireless communications device," "handheld device," "mobile device," "mobile terminal," "mobile station," "handset," "access terminal," "subscriber device," "subscriber terminal," "subscriber station," "terminal," and variants thereof may interchangeably refer to any suitable mobile or stationary device that can receive wireless communication and/or navigation signals. These terms are also intended to include devices which communicate with another device that can receive wireless communication and/or navigation signals such as by short-range wireless, infrared, wireline connection, or other connection, regardless of whether satellite signal reception, assistance data reception, and/or position-related processing occurs at the device or at the other device. In addition, these terms are intended to include all devices, including wireless and wireline communication devices, that can communicate with a core network via a radio access network (RAN), and through the core network the UEs can be connected with external networks such as the Internet and with other UEs. Of course, other mechanisms of connecting to the core network and/or the Internet are also possible for the UEs, such as over a wired access network, a wireless local area network (WLAN) (e.g., based on IEEE 802.11, etc.) and so on. UEs can be embodied by any of a number of types of devices including but not limited to printed circuit (PC) cards, compact flash devices, external or internal modems, wireless or wireline phones, smartphones, tablets, tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cells (high power cellular base stations) and/or small cells (low power cellular base stations), wherein the macro cells may include Evolved NodeBs (eNBs), where the wireless communications system 100 corresponds to an LTE network, or gNodeBs (gNBs), where the wireless communications system 100 corresponds to a 5G network or a combination of both, and the small cells may include femtocells, picocells, microcells, etc.

The base stations 102 may collectively form a Radio Access Network (RAN) and interface with an Evolved Packet Core (EPC) or Next Generation Core (NGC) through backhaul links. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, although not shown in FIG. 1, geographic coverage areas 110 may be subdivided into a plurality of cells (e.g., three), or sectors, each cell corresponding to a single antenna or array of antennas of a base station 102. As used herein, the term "cell" or "sector" may correspond to one of a plurality of cells of a base station 102, or to the base station 102 itself, depending on the context.

While neighboring macro cell geographic coverage areas 110 may partially overlap (e.g., in a handover region), some of the geographic coverage areas 110 may be substantially overlapped by a larger geographic coverage area 110. For example, a small cell base station 102' may have a geographic coverage area 110' that substantially overlaps with the geographic coverage area 110 of one or more macro cell base stations 102. A network that includes both small cell and macro cells may be known as a heterogeneous network. A heterogeneous network may also include Home eNBs (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carriers. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ LTE or 5G technology and use the same 5 GHz unlicensed frequency spectrum as used by the WLAN AP 150. The small cell base station 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100 may further include a mmW base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 may utilize beamforming 184 with the UE 182 to compensate for the extremely high path loss and short range. Further, it will be appreciated that in alternative configurations, one or more base stations 102 may also transmit using mmW or near mmW and beamforming 184. Accordingly, it will be appreciated that the foregoing illustrations are merely examples and should not be construed to limit the various aspects disclosed herein.

The wireless communications system 100 may further include one or more UEs, such as UE 190, that connects indirectly to one or more communication networks via one or more device-to-device (D2D) peer-to-peer (P2P) links. In the embodiment of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192-194 may be supported with any well-known D2D radio access technology (RAT), such as LTE Direct (LTE-D), WiFi Direct (WiFi-D), Bluetooth, and so on.

Figure 2A:
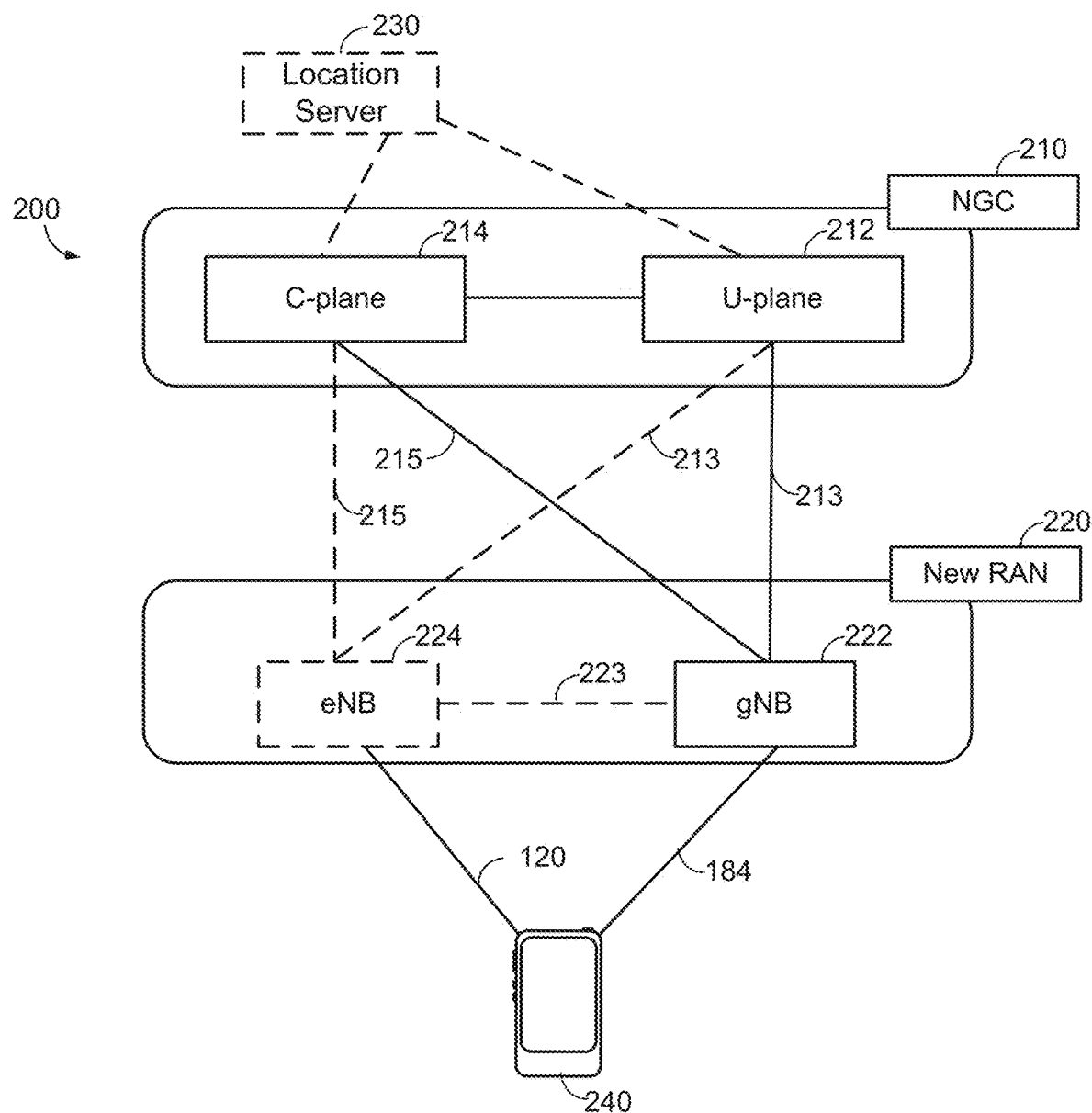
FIGS. 2A and 2B illustrate example wireless network structures, according to various aspects.

According to various aspects, FIG. 2A illustrates an example wireless network structure 200. For example, a Next Generation Core (NGC) 210 can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. Accordingly, in some configurations, the New RAN 220 may only have one or more gNBs 222, while other configurations include one or more of both eNBs 224 and gNBs 222. Either gNB 222 or eNB 224 may communicate with UEs 240 (e.g., any of the UEs depicted in FIG. 1, such as UEs 104, UE 182, UE 190, etc.). Another optional aspect may include Location Server 230 which may be in communication with the NGC 210 to provide location assistance for UEs 240. The location server 230 can be implemented as a plurality of structurally separate servers, or alternately may each correspond to a single server. The location server 230 can be configured to support one or more location services for UEs 240 that can connect to the location server 230 via the core network, NGC 210, and/or via the Internet (not illustrated). Further, the location server 230 may be integrated into a component of the core network, or alternatively may be external to the core network.

Figure 2B:
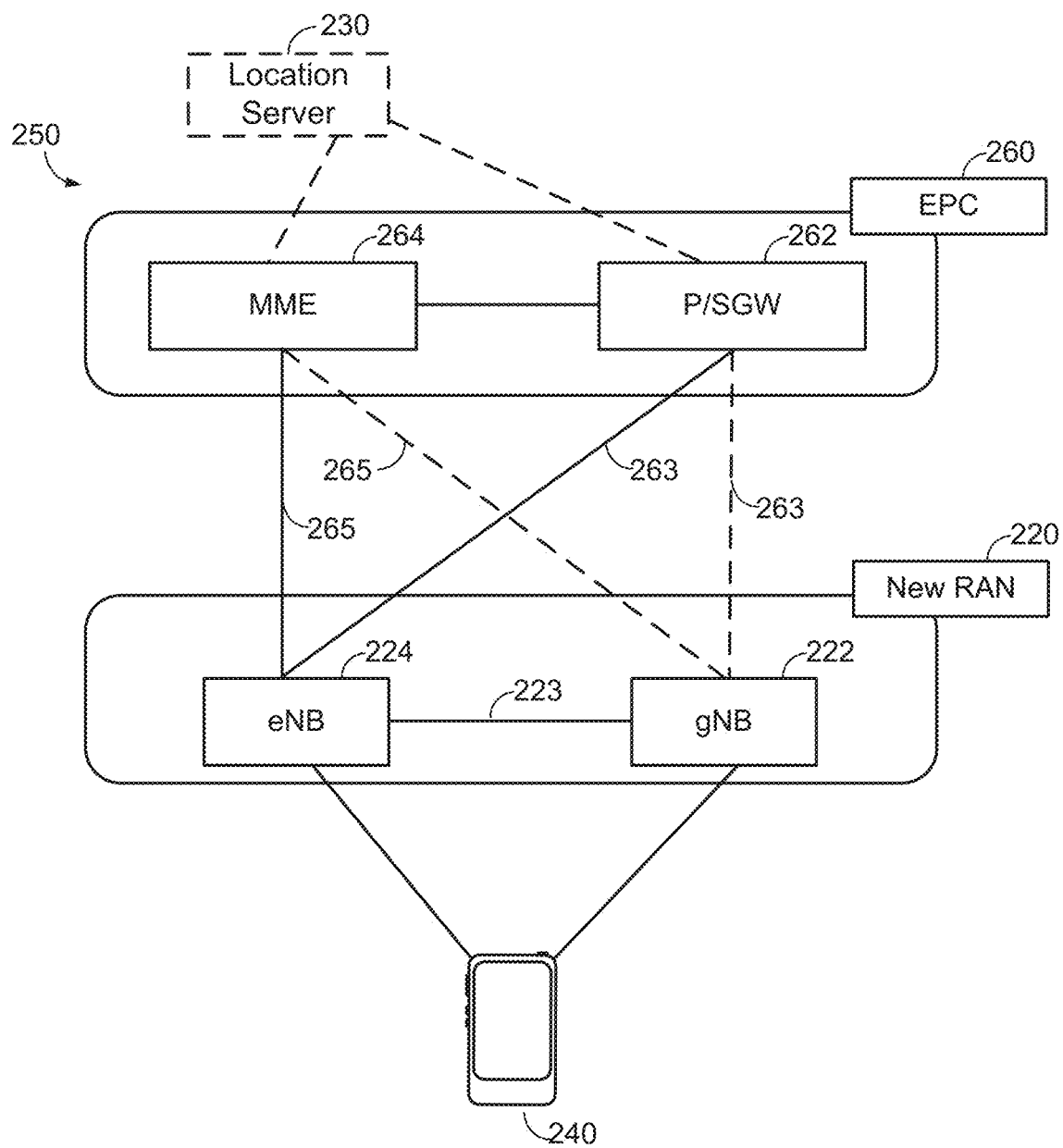

According to various aspects, FIG. 2B illustrates another example wireless network structure 250. For example, Evolved Packet Core (EPC) 260 can be viewed functionally as control plane functions, Mobility Management Entity (MME) 264 and user plane functions, Packet Data Network Gateway/Serving Gateway (P/SGW) 262, which operate cooperatively to form the core network. S1 user plane interface (S1-U) 263 and S1 control plane interface (S1-MME) 265 connect the eNB 224 to the EPC 260 and specifically to MME 264 and P/SGW 262. In an additional configuration, a gNB 222 may also be connected to the EPC 260 via S1-MME 265 to MME 264 and S1-U 263 to P/SGW 262. Further, eNB 224 may directly communicate to gNB 222 via the backhaul connection 223, with or without gNB 222 direct connectivity to the EPC 260. Accordingly, in some configurations, the New RAN 220 may only have one or more gNBs 222, while other configurations include one or more of both eNBs 224 and gNBs 222. Either gNB 222 or eNB 224 may communicate with UEs 240 (e.g., any of the UEs depicted in FIG. 1, such as UEs 104, UE 182, UE 190, etc.). Another optional aspect may include Location Server 230 which may be in communication with the EPC 260 to provide location assistance for UEs 240. The location server 230 can be implemented as a plurality of structurally separate servers, or alternately may each correspond to a single server. The location server 230 can be configured to support one or more location services for UEs 240 that can connect to the location server 230 via the core network, EPC 260, and/or via the Internet (not illustrated).

Figure 3A:
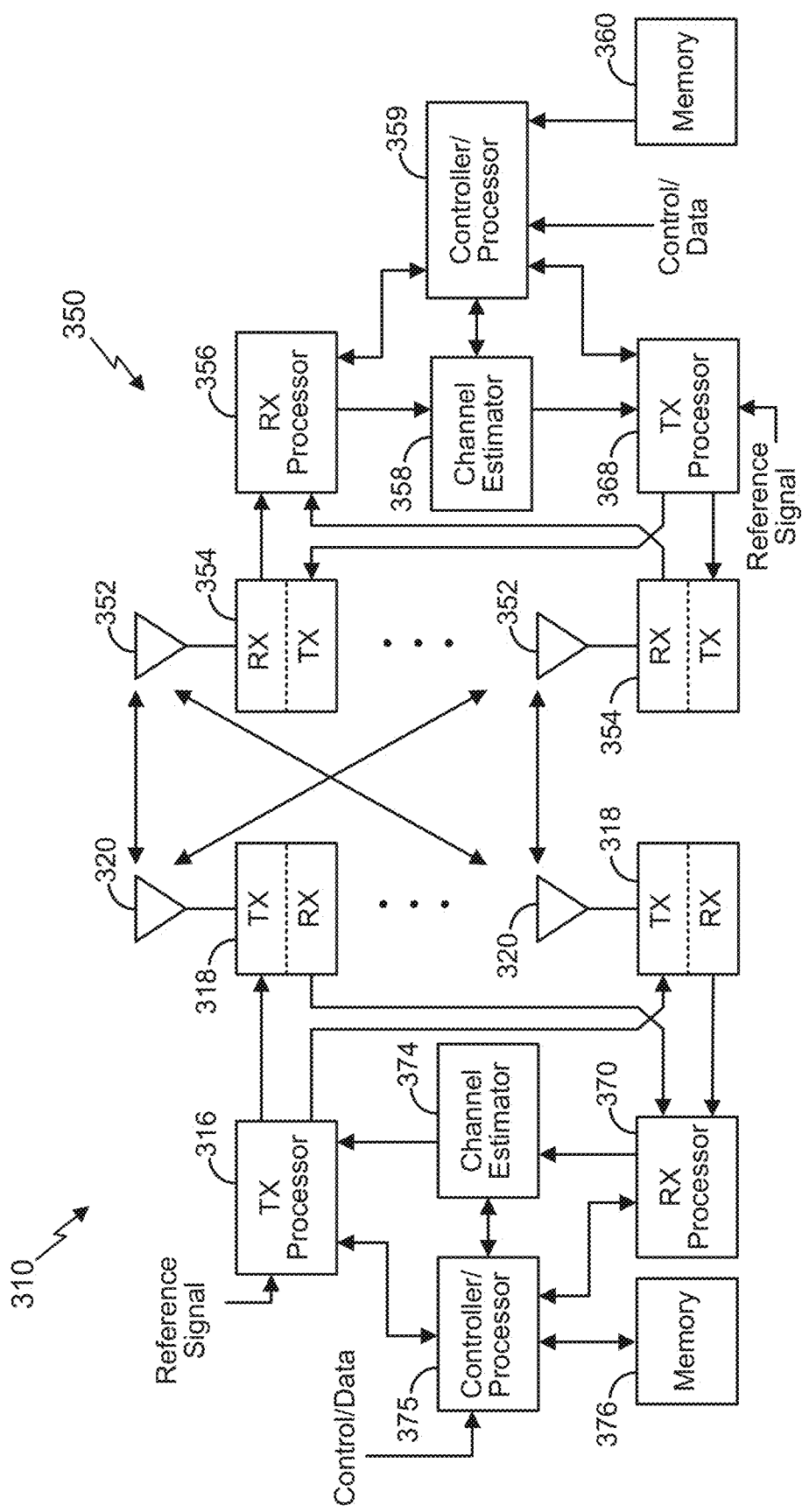
FIG. 3A illustrates an exemplary base station and an exemplary UE in an access network, according to various aspects.

According to various aspects, FIG. 3A illustrates an exemplary base station 310 (e.g., an eNB, a gNB, a small cell AP, a WLAN AP, etc.) in communication with an exemplary UE 350 in a wireless network. In the DL, IP packets from the core network (NGC 210/EPC 260) may be provided to a controller/processor 375. The controller/processor 375 implements functionality for a radio resource control (RRC) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmit (TX) processor 316 and the receive (RX) processor 370 implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to one or more different antennas 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the RX processor 356. The TX processor 368 and the RX processor 356 implement Layer-1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and de-interleaved to recover the data and control signals that were originally transmitted by the base station 310 on the physical channel. The data and control signals are then provided to the controller/processor 359, which implements Layer-3 and Layer-2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the core network. The controller/processor 359 is also responsible for error detection.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the core network. The controller/processor 375 is also responsible for error detection.

Figure 3B:
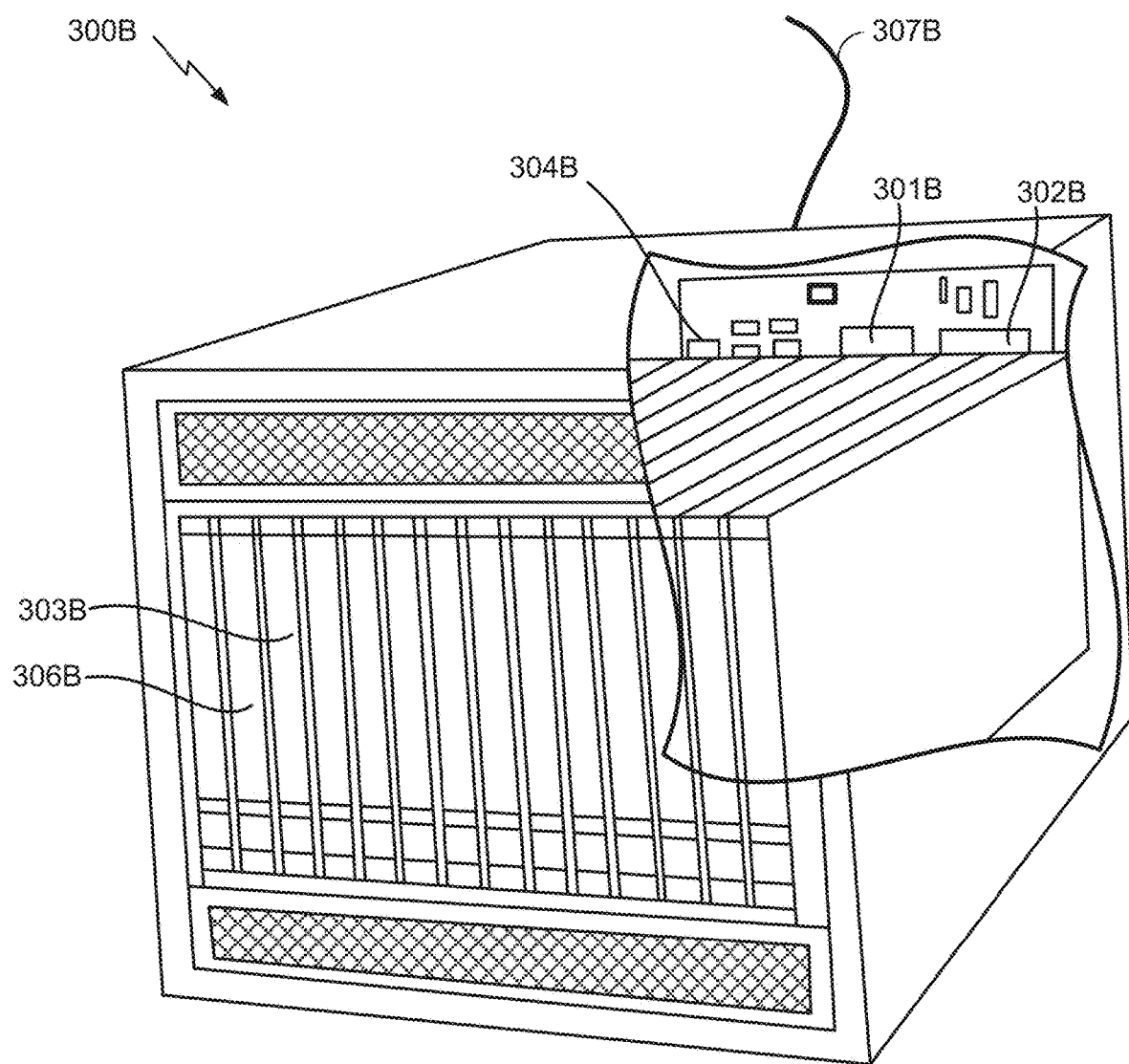
FIG. 3B illustrates an exemplary server according to various aspects of the disclosure.

FIG. 3B illustrates an exemplary server 300B. In an example, the server 300B may correspond to one example configuration of the location server 230 described above. In FIG. 3B, the server 300B includes a processor 301B coupled to volatile memory 302B and a large capacity nonvolatile memory, such as a disk drive 303B. The server 300B may also include a floppy disc drive, compact disc (CD) or DVD disc drive 306B coupled to the processor 301B. The server 300B may also include network access ports 304B coupled to the processor 301B for establishing data connections with a network 307B, such as a local area network coupled to other broadcast system computers and servers or to the Internet.

Figure 4:
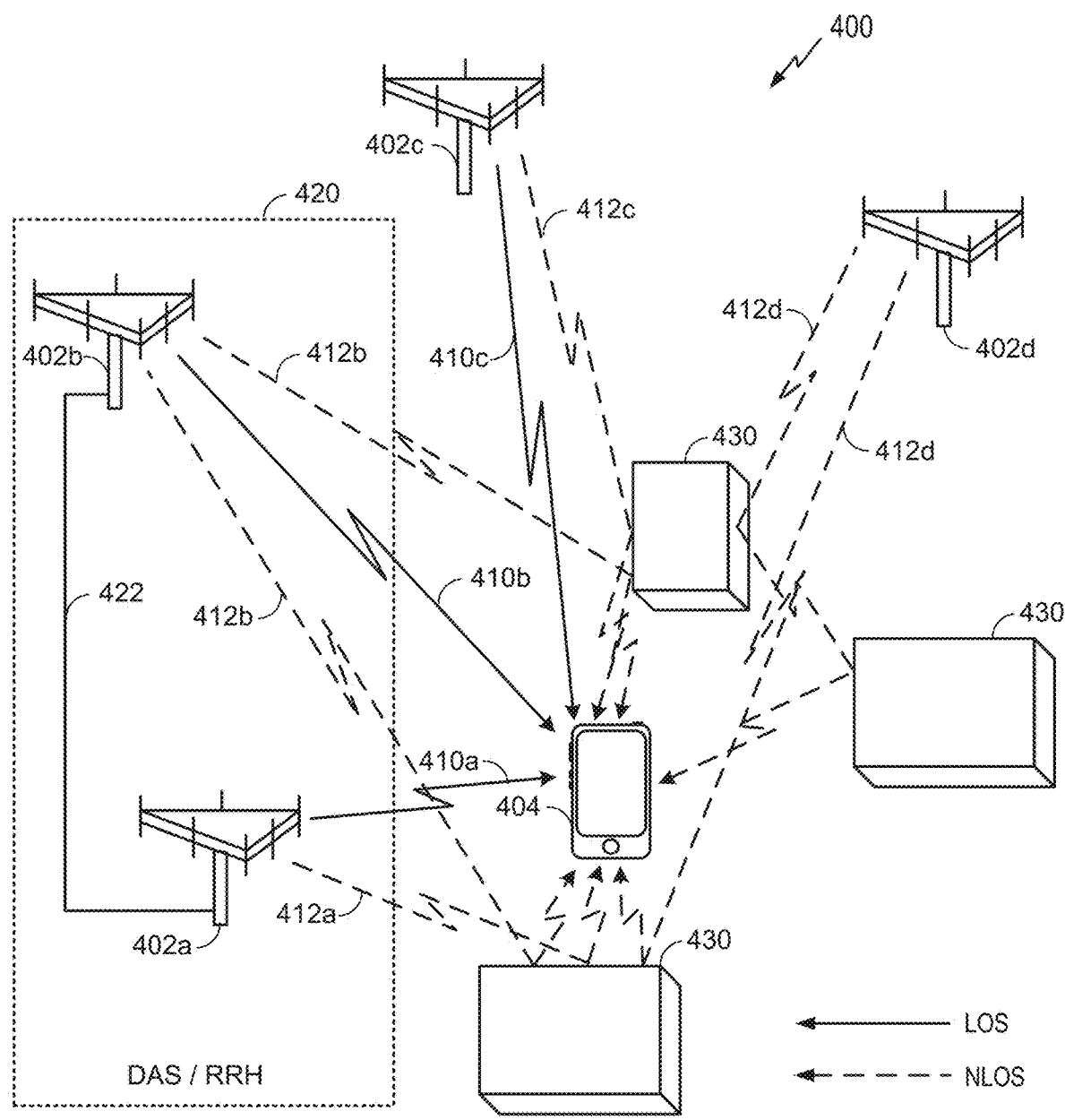
FIG. 4 illustrates an exemplary wireless communications system according to various aspects of the disclosure.

FIG. 4 illustrates an exemplary wireless communications system 400 according to various aspects of the disclosure. In the example of FIG. 4, a UE 404, which may correspond to any of the UEs described above with respect to FIG. 1 (e.g., UEs 104, UE 182, UE 190, etc.), is attempting to calculate an estimate of its position, or assist another entity (e.g., a base station or core network component, another UE, a location server, a third party application, etc.) to calculate an estimate of its position. The UE 404 may communicate wirelessly with a plurality of base stations 402a-d (collectively, base stations 402), which may correspond to any combination of base stations 102 or 180 and/or WLAN AP 150 in FIG. 1, using RF signals and standardized protocols for the modulation of the RF signals and the exchange of information packets. By extracting different types of information from the exchanged RF signals, and utilizing the layout of the wireless communications system 400 (i.e., the base stations locations, geometry, etc.), the UE 404 may determine its position, or assist in the determination of its position, in a predefined reference coordinate system. In an aspect, the UE 404 may specify its position using a two-dimensional coordinate system; however, the aspects disclosed herein are not so limited, and may also be applicable to determining positions using a three-dimensional coordinate system, if the extra dimension is desired. Additionally, while FIG. 4 illustrates one UE 404 and four base stations 402, as will be appreciated, there may be more UEs 404 and more or fewer base stations 402.

To support position estimates, the base stations 402 may be configured to broadcast reference RF signals (e.g., Positioning Reference Signals (PRS), Cell-specific Reference Signals (CRS), Channel State Information Reference Signals (CSI-RS), synchronization signals, etc.) to UEs 404 in their coverage areas to enable a UE 404 to measure reference RF signal timing differences (e.g., OTDOA or RSTD) between pairs of network nodes and/or to identify the beam that best excite the LOS or shortest radio path between the UE 404 and the transmitting base stations 402. Identifying the LOS/shortest path beam(s) is of interest not only because these beams can subsequently be used for OTDOA measurements between a pair of base stations 402, but also because identifying these beams can directly provide some positioning information based on the beam direction. Moreover, these beams can subsequently be used for other position estimation methods that require precise ToA, such as round-trip time estimation based methods.

As used herein, a "network node" may be a base station 402, a cell of a base station 402, a remote radio head, an antenna of a base station 402, where the locations of the antennas of a base station 402 are distinct from the location of the base station 402 itself, or any other network entity capable of transmitting reference signals. Further, as used herein, a "node" may refer to either a network node or a UE.

A location server (e.g., location server 230) may send assistance data to the UE 404 that includes an identification of one or more neighbor cells of base stations 402 and configuration information for reference RF signals transmitted by each neighbor cell. Alternatively, the assistance data can originate directly from the base stations 402 themselves (e.g., in periodically broadcasted overhead messages, etc.). Alternatively, the UE 404 can detect neighbor cells of base stations 402 itself without the use of assistance data. The UE 404 (e.g., based in part on the assistance data, if provided) can measure and (optionally) report the OTDOA from individual network nodes and/or RSTDs between reference RF signals received from pairs of network nodes. Using these measurements and the known locations of the measured network nodes (i.e., the base station(s) 402 or antenna(s) that transmitted the reference RF signals that the UE 404 measured), the UE 404 or the location server can determine the distance between the UE 404 and the measured network nodes and thereby calculate the location of the UE 404.

The term "position estimate" is used herein to refer to an estimate of a position for a UE 404, which may be geographic (e.g., may comprise a latitude, longitude, and possibly altitude) or civic (e.g., may comprise a street address, building designation, or precise point or area within or nearby to a building or street address, such as a particular entrance to a building, a particular room or suite in a building, or a landmark such as a town square). A position estimate may also be referred to as a "location," a "position," a "fix," a "position fix," a "location fix," a "location estimate," a "fix estimate," or by some other term. The means of obtaining a location estimate may be referred to generically as "positioning," "locating," or "position fixing." A particular solution for obtaining a position estimate may be referred to as a "position solution." A particular method for obtaining a position estimate as part of a position solution may be referred to as a "position method" or as a "positioning method."

The term "base station" may refer to a single physical transmission point or to multiple physical transmission points that may or may not be co-located. For example, where the term "base station" refers to a single physical transmission point, the physical transmission point may be an antenna of the base station (e.g., base station 402) corresponding to a cell of the base station. Where the term "base station" refers to multiple co-located physical transmission points, the physical transmission points may be an array of antennas (e.g., as in a MIMO system or where the base station employs beamforming) of the base station. Where the term "base station" refers to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station). Alternatively, the non-co-located physical transmission points may be the serving base station receiving the measurement report from the UE (e.g., UE 404) and a neighbor base station whose reference RF signals the UE is measuring. Thus, FIG. 4 illustrates an aspect in which base stations 402a and 402b form a DAS/RRH 420. For example, the base station 402a may be the serving base station of the UE 404 and the base station 402b may be a neighbor base station of the UE 404. As such, the base station 402b may be the RRH of the base station 402a. The base stations 402a and 402b may communicate with each other over a wired or wireless link 422.

To accurately determine the position of the UE 404 using the OTDOAs and/or RSTDs between RF signals received from pairs of network nodes, the UE 404 needs to measure the reference RF signals received over the LOS path (or the shortest NLOS path where an LOS path is not available), between the UE 404 and a network node (e.g., base station 402, antenna). However, RF signals travel not only by the LOS/shortest path between the transmitter and receiver, but also over a number of other paths as the RF signals spread out from the transmitter and reflect off other objects such as hills, buildings, water, and the like on their way to the receiver. Thus, FIG. 4 illustrates a number of LOS paths 410 and a number of NLOS paths 412 between the base stations 402 and the UE 404. Specifically, FIG. 4 illustrates base station 402a transmitting over an LOS path 410a and an NLOS path 412a, base station 402b transmitting over an LOS path 410b and two NLOS paths 412b, base station 402c transmitting over an LOS path 410c and an NLOS path 412c, and base station 402d transmitting over two NLOS paths 412d. As illustrated in FIG. 4, each NLOS path 412 reflects off some object 430 (e.g., a building). As will be appreciated, each LOS path 410 and NLOS path 412 transmitted by a base station 402 may be transmitted by different antennas of the base station 402 (e.g., as in a MIMO system), or may be transmitted by the same antenna of a base station 402 (thereby illustrating the propagation of an RF signal). Further, as used herein, the term "LOS path" refers to the shortest path between a transmitter and receiver, and may not be an actual LOS path, but rather, the shortest NLOS path.

In an aspect, one or more of base stations 402 may be configured to use beamforming to transmit RF signals. In that case, some of the available beams may focus the transmitted RF signal along the LOS paths 410 (e.g., the beams produce highest antenna gain along the LOS paths) while other available beams may focus the transmitted RF signal along the NLOS paths 412. A beam that has high gain along a certain path and thus focuses the RF signal along that path may still have some RF signal propagating along other paths; the strength of that RF signal naturally depends on the beam gain along those other paths. An "RF signal" comprises an electromagnetic wave that transports information through the space between the transmitter and the receiver. As used herein, a transmitter may transmit a single "RF signal" or multiple "RF signals" to a receiver. However, as described further below, the receiver may receive multiple "RF signals" corresponding to each transmitted RF signal due to the propagation characteristics of RF signals through multipath channels.

Where a base station 402 uses beamforming to transmit RF signals, the beams of interest for data communication between the base station 402 and the UE 404 will be the beams carrying RF signals that arrive at UE 404 with the highest signal strength (as indicated by, e.g., the Received Signal Received Power (RSRP) or SINR in the presence of a directional interfering signal), whereas the beams of interest for position estimation will be the beams carrying RF signals that excite the shortest path or LOS path (e.g., an LOS path 410). In some frequency bands and for antenna systems typically used, these will be the same beams. However, in other frequency bands, such as mmW, where typically a large number of antenna elements can be used to create narrow transmit beams, they may not be the same beams. As described below with reference to FIG. 5, in some cases, the signal strength of RF signals on the LOS path 410 may be weaker (e.g., due to obstructions) than the signal strength of RF signals on an NLOS path 412, over which the RF signals arrive later due to propagation delay.

Figure 5:
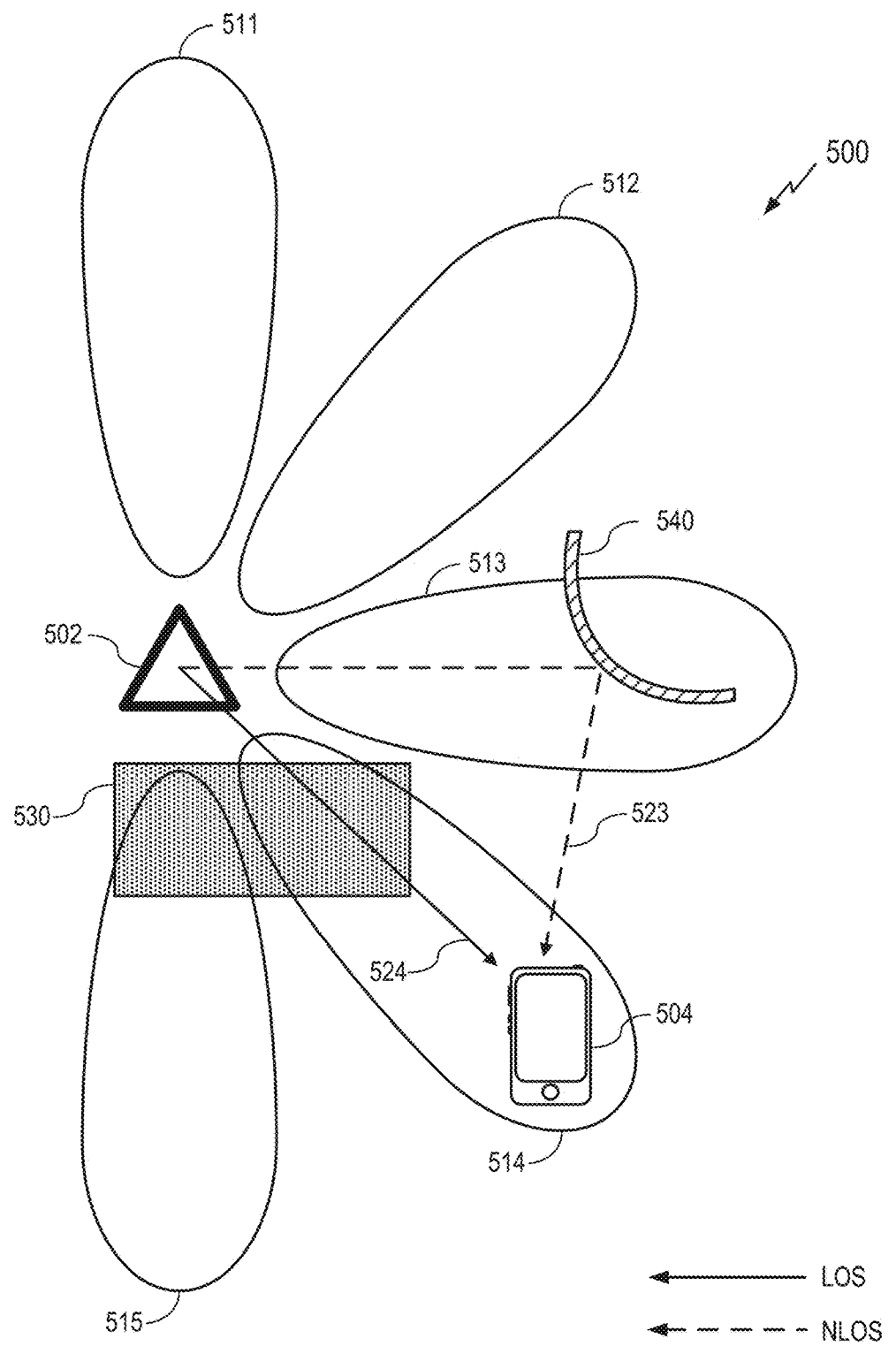
FIG. 5 illustrates an exemplary wireless communications system according to various aspects of the disclosure.

FIG. 5 illustrates an exemplary wireless communications system 500 according to various aspects of the disclosure. In the example of FIG. 5, a UE 504, which may correspond to UE 404 in FIG. 4, is attempting to calculate an estimate of its position, or to assist another entity (e.g., a base station or core network component, another UE, a location server, a third party application, etc.) to calculate an estimate of its position. The UE 504 may communicate wirelessly with a base station 502, which may correspond to one of base stations 402 in FIG. 4, using RF signals and standardized protocols for the modulation of the RF signals and the exchange of information packets.

As illustrated in FIG. 5, the base station 502 is utilizing beamforming to transmit a plurality of beams 511-515 of RF signals. Each beam 511-515 may be formed and transmitted by an array of antennas of the base station 502. Although FIG. 5 illustrates a base station 502 transmitting five beams 511-515, as will be appreciated, there may be more or fewer than five beams, beam shapes such as peak gain, width, and side-lobe gains may differ amongst the transmitted beams, and some of the beams may be transmitted by a different base station.

A beam index may be assigned to each of the plurality of beams 511-515 for purposes of distinguishing RF signals associated with one beam from RF signals associated with another beam. Moreover, the RF signals associated with a particular beam of the plurality of beams 511-515 may carry a beam index indicator. A beam index may also be derived from the time of transmission, e.g., frame, slot and/or OFDM symbol number, of the RF signal. The beam index indicator may be, for example, a three-bit field for uniquely distinguishing up to eight beams. If two different RF signals having different beam indices are received, this would indicate that the RF signals were transmitted using different beams. If two different RF signals share a common beam index, this would indicate that the different RF signals are transmitted using the same beam. Another way to describe that two RF signals are transmitted using the same beam is to say that the antenna port(s) used for the transmission of the first RF signal are spatially quasi-collocated with the antenna port(s) used for the transmission of the second RF signal.

In the example of FIG. 5, the UE 504 receives an NLOS data stream 523 of RF signals transmitted on beam 513 and an LOS data stream 524 of RF signals transmitted on beam 514. Although FIG. 5 illustrates the NLOS data stream 523 and the LOS data stream 524 as single lines (dashed and solid, respectively), as will be appreciated, the NLOS data stream 523 and the LOS data stream 524 may each comprise multiple rays (i.e., a "cluster") by the time they reach the UE 504 due, for example, to the propagation characteristics of RF signals through multipath channels. For example, a cluster of RF signals is formed when an electromagnetic wave is reflected off of multiple surfaces of an object, and reflections arrive at the receiver (e.g., UE 504) from roughly the same angle, each travelling a few wavelengths (e.g., centimeters) more or less than others. A "cluster" of received RF signals generally corresponds to a single transmitted RF signal.

In the example of FIG. 5, the NLOS data stream 523 is not originally directed at the UE 504, although, as will be appreciated, it could be, as are the RF signals on the NLOS paths 412 in FIG. 4. However, it is reflected off a reflector 540 (e.g., a building) and reaches the UE 504 without obstruction, and therefore, may still be a relatively strong RF signal. In contrast, the LOS data stream 524 is directed at the UE 504 but passes through an obstruction 530 (e.g., vegetation, a building, a hill, a disruptive environment such as clouds or smoke, etc.), which may significantly degrade the RF signal. As will be appreciated, although the LOS data stream 524 is weaker than the NLOS data stream 523, the LOS data stream 524 will arrive at the UE 504 before the NLOS data stream 523 because it follows a shorter path from the base station 502 to the UE 504.

As noted above, the beam of interest for data communication between a base station (e.g., base station 502) and a UE (e.g., UE 504) is the beam carrying RF signals that arrives at the UE with the highest signal strength (e.g., highest RSRP or SINR), whereas the beam of interest for position estimation is the beam carrying RF signals that excite the LOS path and that has the highest gain along the LOS path amongst all other beams (e.g., beam 514). That is, even if beam 513 (the NLOS beam) were to weakly excite the LOS path (due to the propagation characteristics of RF signals, even though not being focused along the LOS path), that weak signal, if any, of the LOS path of beam 513 may not be as reliably detectable (compared to that from beam 514), thus leading to greater error in performing a positioning measurement.

While the beam of interest for data communication and the beam of interest for position estimation may be the same beams for some frequency bands, for other frequency bands, such as mmW, they may not be the same beams. As such, referring to FIG. 5, where the UE 504 is engaged in a data communication session with the base station 502 (e.g., where the base station 502 is the serving base station for the UE 504) and not simply attempting to measure reference RF signals transmitted by the base station 502, the beam of interest for the data communication session may be the beam 513, as it is carrying the unobstructed NLOS data stream 523. The beam of interest for position estimation, however, would be the beam 514, as it carries the strongest LOS data stream 524, despite being obstructed.

Figure 6A:
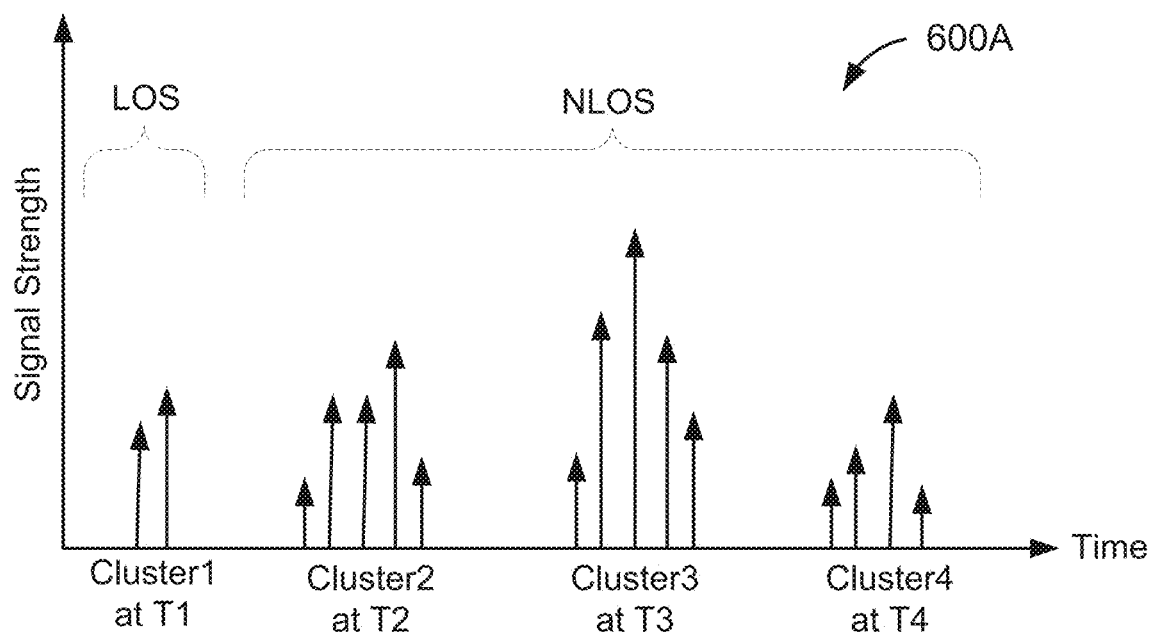
FIG. 6A is a graph showing the RF channel response at a UE over time according to aspects of the disclosure.
Figure 6B:
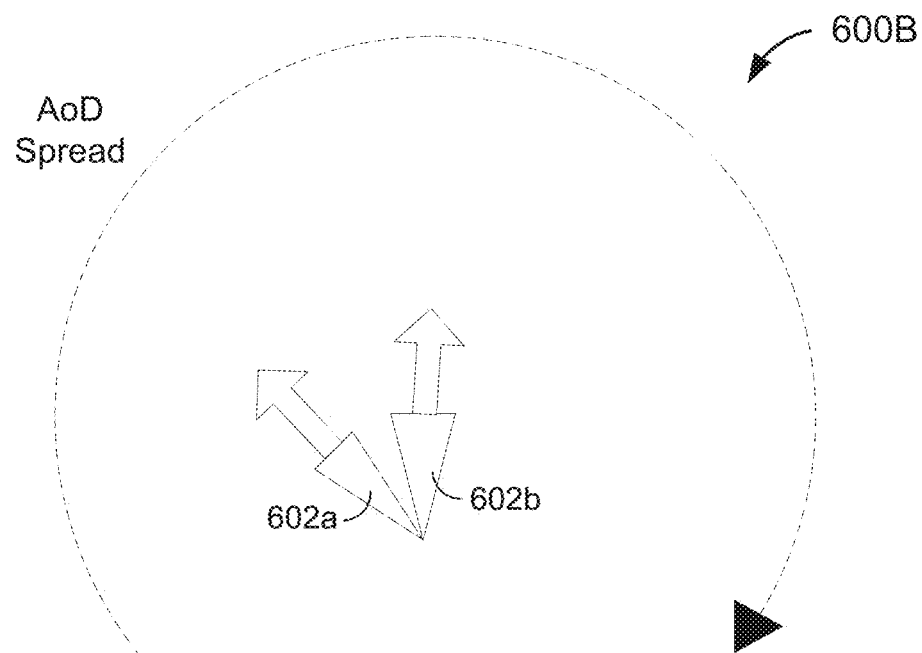
FIG. 6B illustrates an exemplary separation of clusters in Angle of Departure (AoD) according to aspects of the disclosure.

FIG. 6A is a graph 600A showing the RF channel response at a receiver (e.g., UE 504) over time according to aspects of the disclosure. Under the channel illustrated in FIG. 6A, the receiver receives a first cluster of two RF signals on channel taps at time T1, a second cluster of five RF signals on channel taps at time T2, a third cluster of five RF signals on channel taps at time T3, and a fourth cluster of four RF signals on channel taps at time T4. In the example of FIG. 6A, because the first cluster of RF signals at time T1 arrives first, it is presumed to be the LOS data stream (i.e., the data stream arriving over the LOS or the shortest path), and may correspond to the LOS data stream 524. The third cluster at time T3 is comprised of the strongest RF signals, and may correspond to the NLOS data stream 523. Seen from the transmitter's side, each cluster of received RF signals may comprise the portion of an RF signal transmitted at a different angle, and thus each cluster may be said to have a different angle of departure (AoD) from the transmitter. FIG. 6B is a diagram 600B illustrating this separation of clusters in AoD. The RF signal transmitted in AoD range 602a may correspond to one cluster (e.g., "Cluster1") in FIG. 6A, and the RF signal transmitted in AoD range 602b may correspond to a different cluster (e.g., "Cluster3") in FIG. 6A. Note that although AoD ranges of the two clusters depicted in FIG. 6B are spatially isolated, AoD ranges of some clusters may also partially overlap even though the clusters are separated in time. For example, this may arise when two separate buildings at same AoD from the transmitter reflect the signal towards the receiver. Note that although FIG. 6A illustrates clusters of two to five channel taps, as will be appreciated, the clusters may have more or fewer than the illustrated number of channel taps.

As in the example of FIG. 5, the base station may utilize beamforming to transmit a plurality of beams of RF signals such that one of the beams (e.g., beam 514) is directed at the AoD range 602a of the first cluster of RF signals, and a different beam (e.g., beam 513) is directed at the AoD range 602b of the third cluster of RF signals. The signal strength of clusters in post-beamforming channel response (i.e., the channel response when the transmitted RF signal is beamformed instead of omni-directional) will be scaled by the beam gain along the AoD of the clusters. In that case, the beam of interest for positioning would be the beam directed at the AoD of the first cluster of RF signals, as they arrive first, and the beam of interest for data communications may be the beam directed at the AoD of the third cluster of RF signals, as they are the strongest.

In general, when transmitting an RF signal, the transmitter does not know what path it will follow to the receiver (e.g., UE 504) or at what time it will arrive at the receiver, and therefore transmits the RF signal on different antenna ports with an equal amount of energy. Alternatively, the transmitter may beamform the RF signal in different directions over multiple transmission occasions and obtain measurement feedback from the receiver to explicitly or implicitly determine radio paths.

Note that although the techniques disclosed herein have generally been described in terms of transmissions from a base station to a UE, as will be appreciated, they are equally applicable to transmissions from a UE to a base station where the UE is capable of MIMO operation and/or beamforming. Also, while beamforming is generally described above in context with transmit beamforming, receive beamforming may also be used in conjunction with the above-noted transmit beamforming in certain embodiments.

As discussed above, in some frequency bands, the shortest path (which may, as noted above, be a LOS path or the shortest NLOS path) may be weaker than an alternative longer (NLOS) path (over which the RF signal arrives later due to propagation delay). Thus, where a transmitter uses beamforming to transmit RF signals, the beam of interest for data communication—the beam carrying the strongest RF signals—may be different from the beam of interest for position estimation—the beam carrying the RF signals that excite the shortest detectable path. As such, it would be beneficial for the receiver to identify and report the beam of interest for position estimation to the transmitter to enable the transmitter to subsequently modify the set of transmitted beams to assist the receiver to perform a position estimation.

Figure 7:
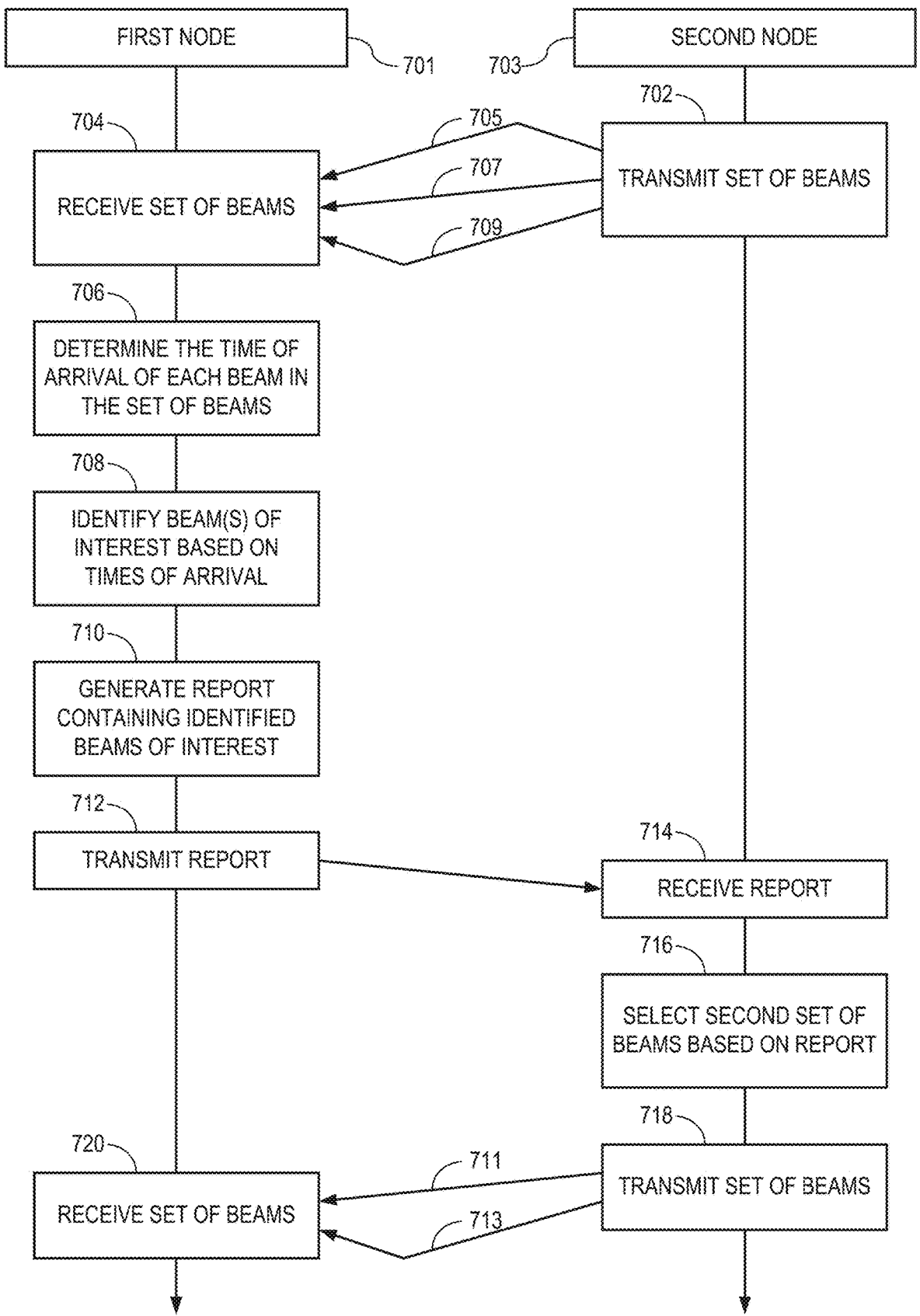
FIGS. 7-8 and 10-12 illustrate exemplary methods, according to various aspects.

FIG. 7 illustrates an exemplary method according to an aspect of the disclosure. At 702, a second node 703 (referred to as the "transmitter") transmits a set of beams 705, 707, and 709 to a first node 701 (referred to as the "receiver"). In an aspect, the first node 701 may be a UE, such as UE 350/404/504, and the second node 703 may be a base station, such as base station 310/402/502. However, in an aspect, the first node 701 may be a base station and the second node 703 may be a UE, or both the first node 701 and the second node 703 may be UEs or base stations. As yet another alternative, the second node 703 may be a single antenna or antenna array of a base station or UE capable of beamforming.

In the example of FIG. 7, the second node 703 transmits a set of three beams 705, 707, and 709. These beams may be transmitted simultaneously but distinguishable in frequency and/or code domain. Alternatively, these beams may be transmitted sequentially. The second node 703 may transmit the beams 705, 707, and 709 at different AoDs, as illustrated above in FIGS. 5 and 6B. In the example of FIG. 7, the beam 707 (illustrated as a straight line) may follow the shortest path (e.g., LOS path or shortest NLOS path when the LOS path is undetectable due to obstruction) from the second node 703 to the first node 701, and the beams 705 and 709 may follow longer (e.g., NLOS) paths from the second node 703 to the first node 701. As will be appreciated, there may be more or fewer than three beams, as shown above in the examples of FIGS. 4 and 5. In an aspect, the beams 705, 707, and 709 may carry synchronization signals, such as Synchronization Signal (SS) or PBCH blocks, CSI reference signals, positioning reference signals, cell reference signals, sounding reference signals, random access preamble, or the like.

At 704, the first node 701 receives the beams 705, 707, and 709. At 706, the first node 701 determines the time of arrival of each beam 705, 707, and 709. In an aspect, the first node 701 may determine the time of arrival of a beam as the time at which the first node 701 detects the first (or earliest) channel tap of the radio channel between the nodes, where the channel is estimated from the received RF signal of a beam 705, 707, or 709. For example, the first node 701 may correlate the received signal of a beam with the (conjugate of) known transmitted RF signals and determine the channel taps from the peaks of correlation. The first node 701 may further estimate noise and eliminate channel taps that are less reliable for being comparable to a noise floor. The first node 701 may further employ techniques to eliminate spurious side peaks around strong channel taps, where the spurious side peaks are well known to arise from bandlimited reception at the first node 701. For simplicity, the first channel tap of an RF signal of a beam may also be referred to as the first channel tap of a beam.

At 708, the first node 701 identifies one or more beams of interest from the set of beams 705, 707, and 709 based on the times of arrival determined at 706. As noted above, in some frequency bands where typically deployed antenna systems do not create narrow enough beams, the beam(s) of interest would be the beam(s) 705, 707, and/or 709 carrying RF signals with the highest received signal strength at the first node 701 (e.g., RSRP or SINR), as these would also be the beam(s) following the shortest path to the first node 701. However, as discussed above, in some frequency bands, such as mmW, the beam carrying RF signals with the highest received signal strength may not be the best beam for positioning operations as it may not follow the shortest detectable path to the first node 701. As such, rather than select the beam(s) carrying RF signals with the highest received signal strength, the first node 701 instead identifies one or more of the earliest arriving beams of the beams 705, 707, and 709 as the one or more beams of interest. For example, the one or more beams of interest may be the beam 705, 707, or 709 with the first detected channel tap. Or the one or more beams of interest may be the N (greater than 1, e.g., 2) beams with the earliest detected channel taps. Or the one or more beams of interest may be the beam, or N beams, whose first detected channel tap is within a predetermined delay (e.g., 10 nanoseconds) from the first detected tap of the beam with the earliest detected first tap. At the speed of light of about 0.3 meters per nanosecond (ns), an error or ambiguity of 10 ns in time of arrival corresponds to a positioning/distancing error of approximately three meters. Therefore, the delay may be determined by the desired accuracy or achievable accuracy in the presence of other limiting factors, such as signal pulse width (related to signal bandwidth). The delay parameter may be provided to the second node 703 by the first node 701, or determined by the first node 701 itself and reported to the second node 703. In an aspect, where the first node 701 is a UE, the second node 703 (a base station) may command the first node 701 to report the beams of interest for position estimation (instead of the beams with the highest received signal strength, as is conventionally done), the number N of beams to report, and/or the "delay" parameter for selecting N beams.

At 710, the first node 701 generates a report containing identifiers (e.g., beam indices) of the one or more beams of interest identified at 708. At 712, the first node 701 transmits the report to the second node 703.

At 714, the second node 703 receives the report. The first node 701 may transmit at 712, and the second node 703 may receive at 714, the report over a wireless interface, such as a communication link 120 in FIG. 1. The reception point of the second node 703 that receives the report may or may not be collocated with the transmission point(s) of second node 703 from which the beams 705, 707, 709 are transmitted. For example, the reception point of the second node 703 that receives the report may be assigned a different cell identity than that of the transmission point of the node that transmits the beams. The reception point may be the serving cell and the transmission point may be a non-serving cell, such as a neighbor cell.

At 716, the second node 703 can select a second set of beams for transmission based on the received report. For example, where the first node 701 is attempting to perform a position estimation and the identified beam(s) are cell synchronization beam(s), the second node 703 can update the beam(s) identified in the report to transmit positioning RF signals, such as PRS or CSI-RS. Generally, beams transmitting synchronization signals are broader (less focused) than beams transmitting reference RF signals (e.g., CSI-RS). As such, in an aspect, the second node 703 may also transmit one or more finer (more focused) beams around the beam(s) identified in the report, after they have been modified to transmit reference RF signals. More specifically, the second node 703 may narrow the focus of the identified beam(s) and transmit one or more additional narrowly focused beams in the direction of the identified beam(s).

As another example, again where the first node 701 is attempting to perform a position estimation and the identified beam(s) are cell synchronization beam(s), the second node 703 can transmit one or more beams carrying positioning RF signals in the direction of the beam(s) identified in the report, without modifying the beam(s) identified in the report. Thus, in an aspect, the transmission of beams 705, 707, and 709 at 702 may be periodic (e.g., a broadcast for the benefit of all UEs served by the second node, where the second node is a base station), and the selection of beams at 716 may be for the transmission of specific positioning beacons for the benefit of the first node only, and may be transmitted at a different periodicity or aperiodically.

In an aspect, where the first node 701 is a base station, then reporting the beam indices at 710 and 712 means that the first node 701 asks the second node 703 (the UE) to transmit further reference beams based on the report. For example, the request may be to transmit the reported beams again, or to transmit finer beams around the reported beams. Thus, the operation at 708 is a way to shortlist the beam(s) of interest and subsequently to use the shortlisted beam(s) for on-going position estimation while discarding the 'uninteresting' beams.

At 718, the second node 703 transmits the second set of beams, here, beams 711 and 713. As discussed above, the beams 711 and 713 may correspond to two of the beams 705, 707, and 709 (where the report received at 714 identifies two of beams 705, 707, and 709), but modified to transmit reference RF signals (e.g., PRS, CRS). Alternatively, beams 711 and 713 may correspond to one of beams 705, 707, and 709 modified to transmit reference RF signals, and an additional beam transmitting reference RF signals in the direction of the beams identified in the report received at 714. In yet another aspect, beams 711 and 713 may be two new beams transmitting reference RF signals in the direction of the beams identified in the report received at 714. In an aspect, although not illustrated, prior to transmitting the beams 711 and 713, the second node 703 may transmit an indication of which beams it has selected for transmission at 718.

In the example of FIG. 7, there are two beams (711 and 713) transmitted at 718. However, as will be appreciated, this is merely an example, and there may be more or fewer beams transmitted at 718. In addition, in FIG. 7, beam 711 is illustrated as following a LOS path and beam 713 is illustrated as following an NLOS path (i.e., as reflected off an object). However, as will be appreciated, both beams 711 and 713 may follow a LOS path, or both may be reflected.

At 720, the first node 701 receives the beams 711 and 713. The first node 701 may perform the process of FIG. 7 with a plurality of second nodes, including the second node 703, in order to receive a sufficient number of shortest path beams that can be accurately measured to calculate, or assist the calculation of, a position estimate. For example, to perform a single OTDOA measurement, the first node 701 needs to measure reference RF signals from at least two second nodes. The first node 701 may make multiple OTDOA measurements to improve accuracy of a position estimate of the first node 701.

Figure 8:
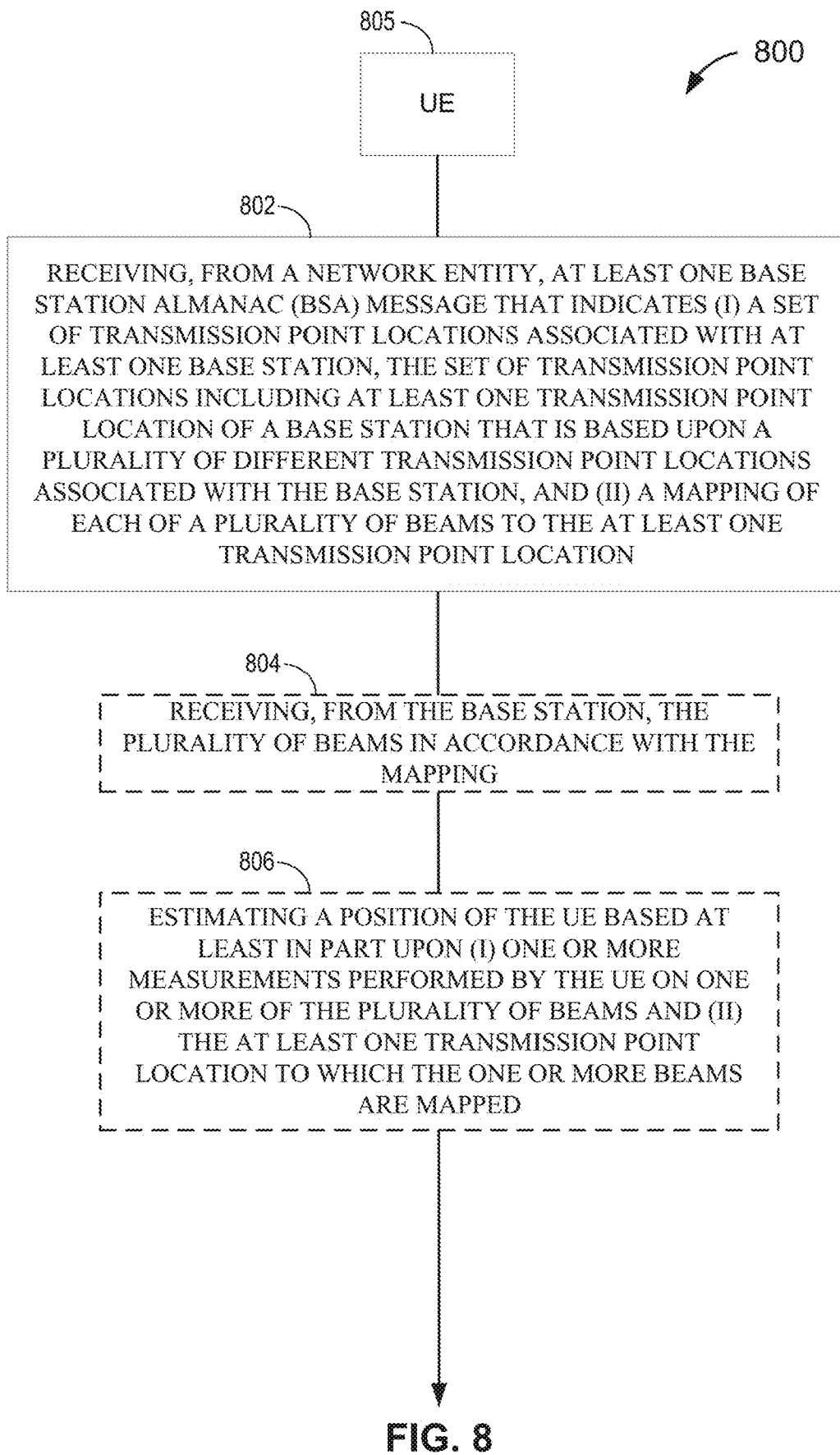

FIG. 8 illustrates an exemplary method 800 for determining a position estimate of a UE in accordance with an embodiment of the disclosure. The method 800 may be performed by a UE 805, which may correspond to any one of UEs 104, 240 or 350 as described above with respect to FIGS. 1-3A.

Referring to FIG. 8, at 802, the UE 805 (e.g., antenna(s) 352, receiver(s) 354, and/or RX processor 356) receives, from a network entity, at least one base station almanac (BSA) message that indicates (i) a set of transmission point locations associated with at least one base station, the set of transmission point locations including at least one transmission point location of a base station that is based upon a plurality of different transmission point locations associated with the base station, and (ii) a mapping of each of a plurality of beams to the at least one transmission point location. In an example, the network component from which the at least one BSA message is received corresponds to the base station itself. In an alternative example, the at least one BSA message may be received from a server, such as the location server 230, although the base station may facilitate the wireless transmission of the at least one BSA message even if the base station does not act as the originating source of the at least one BSA message.

Figure 9:
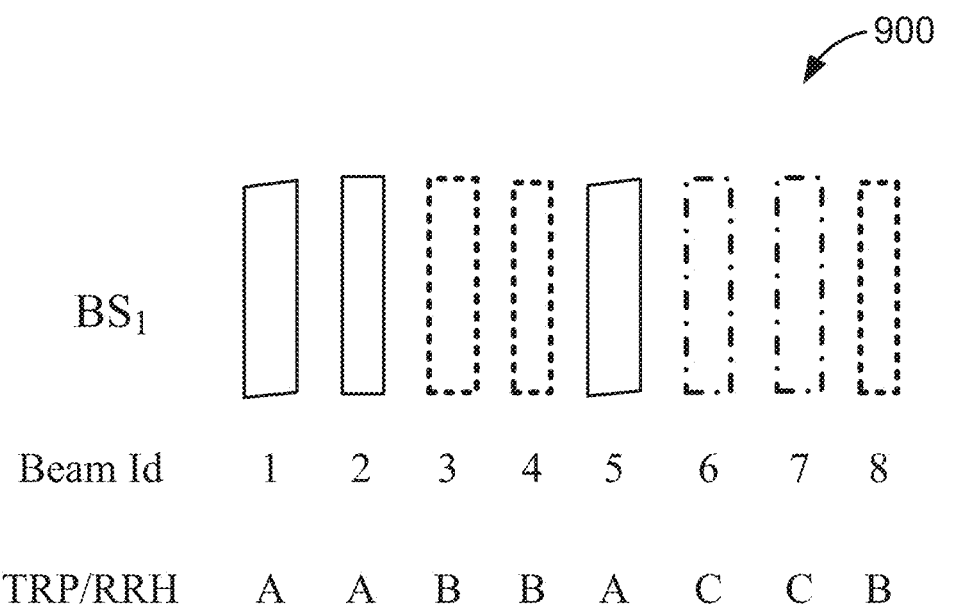
FIG. 9 illustrates an arrangement of beams being transmitted by a base station in accordance with an embodiment of the disclosure.
Figure 9:
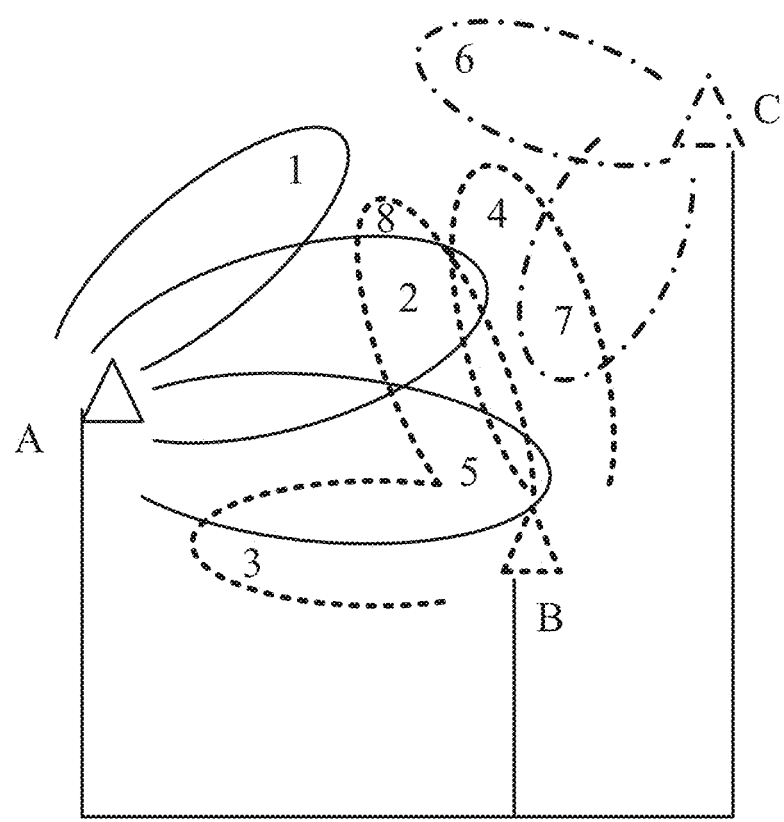

FIG. 9 illustrates an arrangement 900 of beams being transmitted by a base station ($BS_1$) in accordance with aspects of the disclosure. In FIG. 9, the base station is provisioned with three distinct transmission point locations denoted as A, B and C, which are connected to each other via a backhaul link. In particular, the transmission point locations A, B and C correspond to different antennas (or antenna arrays) through which the base station can transmit beams of RF signals. These respective antennas may be referred to as remote radio heads (RRHs) or remote radio units (RRUs). In the embodiment of FIG. 9, the base station collectively transmits eight (8) total beams indexed with beam indices 1 ... 8 from transmission point locations A, B and C, as follows:

TABLE 1

Mapping of Beams to Different Transmission Point Locations for Base Station

| Beam Index | Transmission Point Location |
|---|---|
| 1 | A |
| 2 | A |
| 3 | B |
| 4 | B |
| 5 | A |
| 6 | C |
| 7 | C |
| 8 | B |

The information noted above in Table 1 may be determined in advance and stored in a BSA database (more specifically, in a BSA record for the base station), which is accessible to the network entity via a lookup operation.

Turning back to 802 of FIG. 8, in an example, the at least one BSA message may convey some or all of the information contained in Table 1. In a first example, the at least one BSA message may indicate the specific locations of each of the transmission point locations A, B and C along with the associated beams being transmitted at each transmission point location. In a second example, instead of each beam being individually mapped to a particular transmission point location, the beams may instead be mapped to a representative single representative transmission point location that is based upon the transmission point locations A, B and C. This representative single representative transmission point location may be denoted as transmission point location A+B+C. For example, the transmission point location A+B+C may be averaged (e.g., weighted average, etc.) in some manner from the different transmission point locations A, B and C. In an alternative example, the transmission point location A+B+C may correspond to one of the different transmission point locations A, B and C. An example mapping of beams 1 . . . 8 in FIG. 9 to transmission point locations A, B and C is as follows:

TABLE 2

Mapping of Beams to Representative Transmission Point Location for Base Station

| Beam Index | Transmission Point Location |
| --- | --- |
| 1 | A + B + C |
| 2 | A + B + C |
| 3 | A + B + C |
| 4 | A + B + C |
| 5 | A + B + C |
| 6 | A + B + C |
| 7 | A + B + C |
| 8 | A + B + C |

The information noted above in Table 2 may be determined in advance and stored in a BSA database (more specifically, in a BSA record for the base station), which is accessible to the network entity via a lookup operation.

In a third example, instead of a single representative transmission point location being used for all beams transmitted by a particular base station, representative transmission point locations may be used for particular subsets of beams. For example, certain beams with the same beam index may be transmitted from different transmission point locations. In terms of beam mapping, the UE can be notified of each transmission point location to which this beam is mapped, or to a representative transmission point location based on the transmission point locations. Consider a scenario as shown in Table 1 above, except the beam with beam index 1 is transmitted from both A and B, and the beam with beam index 8 is transmitted from both B and C, and shown in Table 3:

TABLE 3

Mapping of Beams to Different Transmission Point Locations for Base Station

| Beam Index | Transmission Point Location |
| --- | --- |
| 1 | A + B |
| 2 | A |
| 3 | B |
| 4 | B |
| 5 | A |
| 6 | C |

TABLE 3-continued

Mapping of Beams to Different Transmission Point Locations for Base Station

| Beam Index | Transmission Point Location |
| --- | --- |
| 7 | C |
| 8 | B + C |

In this case, the BSA message can be configured to notify the UE that beam index 1 is transmitted from both A and B by indicating both transmission point locations, or alternatively can identify a location that approximates (e.g., averages) the transmission point locations of A and B. Likewise, the BSA message can be configured to notify the UE that beam index 8 is transmitted from both B and C by indicating both transmission point locations, or alternatively can identify a location that approximates (e.g., averages) the transmission point locations of B and C. The information noted above in Table 3 may be determined in advance and stored in a BSA database (more specifically, in a BSA record for the base station), which is accessible to the network entity via a lookup operation.

Referring to FIG. 8, at 804, at the UE 805 (e.g., antenna(s) 352, receiver(s) 354, and/or RX processor 356) optionally receives, from the base station, the plurality of beams in accordance with the mapping. At 806, the UE 805 (e.g., controller/processor 359) optionally estimates a position of the UE based at least in part upon (i) one or more measurements performed by the UE on one or more of the plurality of beams and (ii) the at least one transmission point location to which the one or more beams are mapped.

Referring to 802 of FIG. 8, in an example, the plurality of beams received at the UE 805 may carry synchronization signal blocks (SSBs). In an example specific to 5G NR, SSBs may be transmitted using up to 64 different transmission beams or transmission precoders, so a number of different cells and/or transmission point locations can use SSBs as positioning beacons without a conflict. Other beam-swept signals that can be used as positioning signals may include reference signals (RSs), such as a PRS, a UE-specific or cell-specific CSI-RS, and so on.

In an example, the one or more measurements used to estimate the UE position at 806 may correspond to Time of Arrival (ToA) measurements. The ToA measurements may be used to compute OTDOA between ToA of beams transmitted from different transmission locations, where the OTDOA measurements are subsequently used to derive the UE position estimate. Similarly, the ToA measurements may be used as part of round trip propagation time (RTT) estimation procedure(s) between the UE 805 and the transmission location points of the base station, after which the calculated RTT(s) are used to derive the UE position estimate (e.g., via multilateration, such as trilateration). For example, if the at least one transmission location point used at 806 is the plurality of different transmission location points, the UE determines a mapping of each beam to a respective transmission location point based on the at least one BSA message, and then derives a different RTT to each transmission location point based on the associated ToA measurements for that transmission location point's mapped beam(s). UE may not compute a ToA for a transmission location point from which the UE does not detect a beam (or does not detect the beam reliably enough) for estimating ToA. In another example, if the at least one transmission location point used at 806 is the single representative transmission location point, the UE derives a single RTT to the single representative transmission location point based on the associated ToA measurements for the plurality of beams (e.g., as if each beam was transmitted from the single representative transmission location point, irrespective of which transmission location point the beams were actually transmitted from).

Referring to 806 of FIG. 8, in a further example, assume that the UE 805 cannot ascertain the transmission point location to which a particular beam or group of beams is mapped. In this case, the UE 805 may determine multiple candidate transmission point locations to which at least one of the one or more beams is mapped. For example, as noted above with respect to Table 3, the UE 805 may be notified via the BSA message(s) that a particular beam is being transmitted from multiple transmission point locations. The UE 805 may then estimate multiple candidate position estimates of the UE 805 at 806 based on the multiple candidate transmission point locations. For example, the UE 805 may select one transmission point location from the multiple candidate transmission point locations, and assume that the detected ToA is based on the signal received from the selected transmission point location. That is, in the multilateration procedure, the location of the selected transmission point is used as the only transmission location of the signal and a candidate position of the UE 805 estimated under this assumption. In this manner, the UE 805 can calculate a candidate position estimate corresponding to each candidate transmission point location. The UE 805 may then derive the position estimate for the UE based on the multiple candidate position estimates. For example, the position estimate derivation may include (i) averaging of the multiple candidate position estimates, or (ii) selecting the candidate position estimate that is most congruent with one or more other positioning measurements such as ToA measurements from other known transmission locations and previously estimated position estimates for the UE. For example, the most congruent candidate position estimate may correspond to the position estimate that is geographically closest to one or more previous position estimates for the UE, the position estimate that tracks closest to a trajectory at which the UE has been logged as moving, and so on. Similarly, the UE 805 may employ statistical techniques for outlier elimination such as RANSAC algorithm to eliminate false hypotheses on the candidate transmission point locations when a beam is transmitted from multiple transmission points locations.

Figure 10:
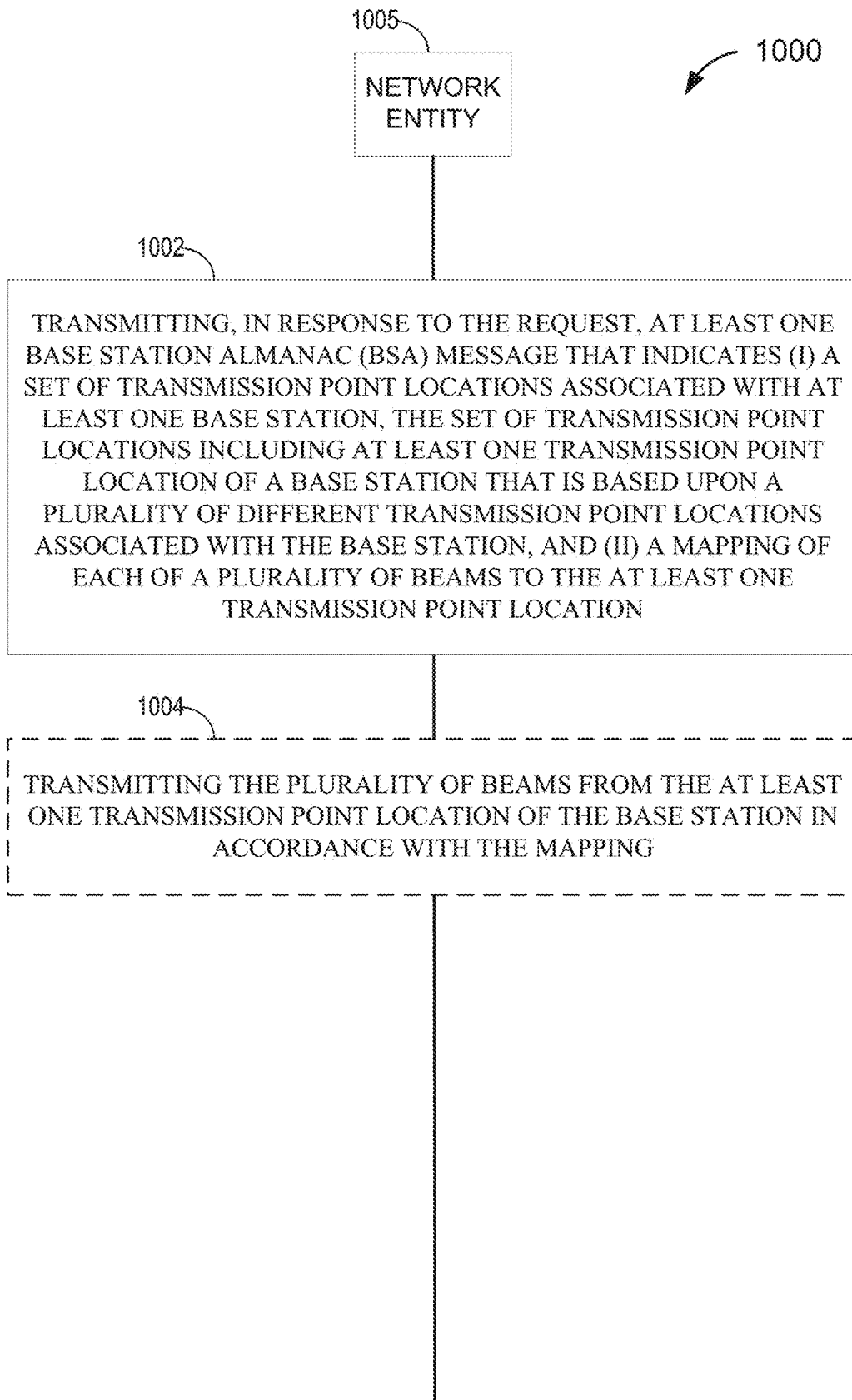

FIG. 10 illustrates an exemplary method 1000 for transmitting location information pertaining to a plurality of different transmission point locations associated with a base station in accordance with an embodiment of the disclosure. The method 1000 may be performed by a network entity 1005, which may correspond to a base station such as any of base stations 102, 222, 224, 31, 402a-402d, 502, or alternatively to a server such as 230 or 300B.

Referring to FIG. 10, at 1002, the network entity 1005 (e.g., antenna(s) 320, transmitter(s) 318, and/or TX processor 316, network access ports 304B) transmits, to a UE, at least one BSA message that indicates (i) a set of transmission point locations associated with at least one base station, the set of transmission point locations including at least one transmission point location of a base station that is based upon a plurality of different transmission point locations associated with the base station, and (ii) a mapping of each of a plurality of beams to the at least one transmission point location. In an example, the at least one BSA message transmitted at 1002 corresponds to the at least one BSA message received by the UE 805 at 802 of FIG. 8.

Referring to FIG. 10, at 1004, the network entity 1005 (e.g., antenna(s) 320, transmitter(s) 318, and/or TX processor 316) optionally transmits the plurality of beams from the at least one transmission point location of the base station in accordance with the mapping. The transmission at 1004 may be performed by the network entity 1005 if the network entity 1005 corresponds to the base station. However, as noted above, the network entity 1005 could also correspond to a server that is separate from the base station transmitting the beams, in which case 1004 is not performed by the network entity 1005. In an example, the beams that are optionally transmitted by the network entity 1005 at 1004 correspond to the beams received by the UE 805 at 804 of FIG. 8.

Figure 11:
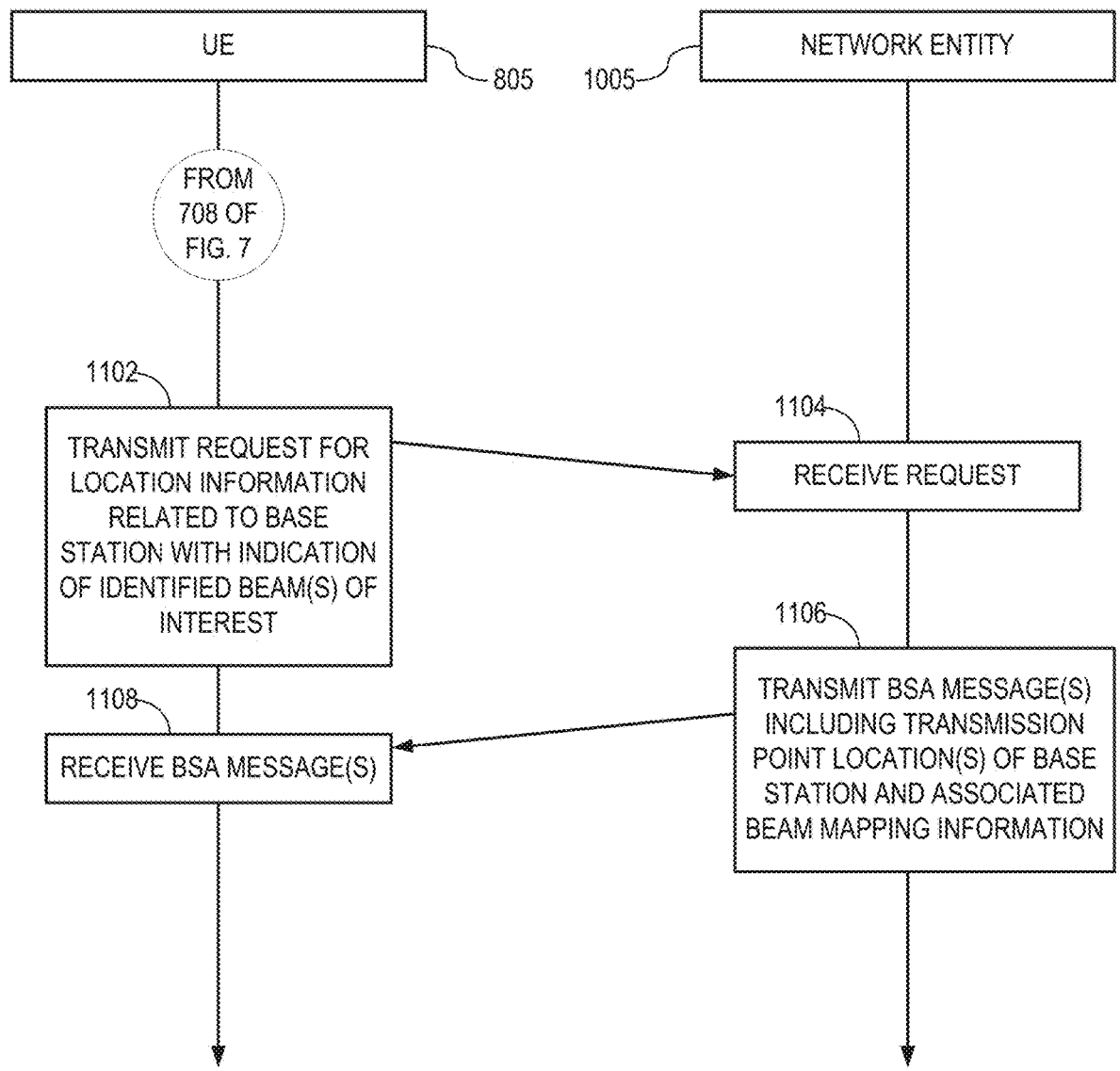
Figure 12:
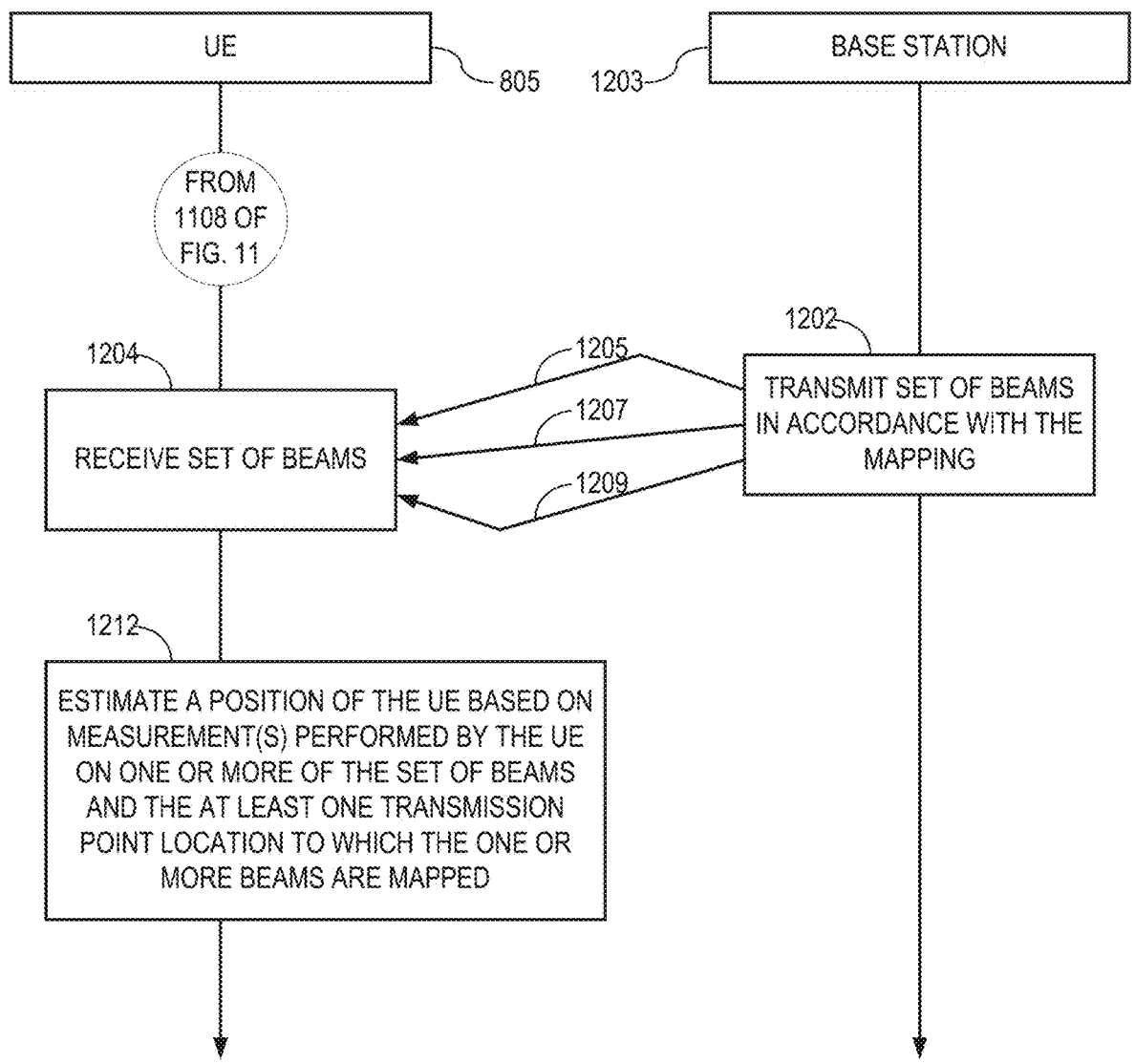

FIGS. 11-12 illustrate example implementations of the processes of FIGS. 8 and 10 in accordance with embodiments of the disclosure.

Referring to FIG. 11, assume that 702-708 of FIG. 7 are performed. After 708 of FIG. 7, at 1102, the UE 805 transmits, to the network entity 1005, a request for location information related to the base station along with an indication of the identified beam(s) of interest from 708. The network entity 1005 receives the request at 1104. At 1106, the network entity 1005 transmits at least one BSA message including transmission point location(s) that are mapped to the identified beam(s) of interest, along with the associated mapping information. At 1108, the UE 805 receives the at least one BSA message. The BSA message(s) exchanged at 1106-1108 may correspond to the BSA message(s) exchanged at 802 of FIG. 8 or 1002 of FIG. 10. So, the process of FIG. 11 demonstrates that the BSA message(s) may be exchanged responsive to a request from the UE 805, in particular, a request that is both base station-specific and beam-specific.

In other embodiments, the UE 805 need not specify any particular beam(s) of interest as in FIG. 11. Rather, the UE 805 need only identify the base station for which location information is needed, and the network entity 1005 can send BSA message(s) that convey all the transmission point location(s) that are mapped to any beam being transmitted by that base station, along with the associated mapping information. Moreover, the network entity 1005 may send transmission point location information for one or more other base stations as well, either in the same BSA message(s) or in different BSA message(s).

Referring to FIG. 12, assume that 1102-1108 of FIG. 11 are performed. After 1108 of FIG. 11, at 1202, the base station (denoted as base station 1203 in FIG. 12) transmits, to the UE 805, a set of beams including beams 1205, 1207 and 1209 in accordance with the mapping that is conveyed by the BSA message(s) from 1106-1108. The set of beams is received by the UE 805 at 1204. The beams exchanged at 1202-1204 may correspond to the beams exchanged at 804 of FIG. 8 or 1004 of FIG. 10. At 1212, the UE 805 estimates its position based on measurement(s) performed by the UE 805 on one or more beams from the set of beams as well as the at least one transmission point location (e.g., a plurality of different beam-mapped transmission point locations or a single representative transmission point location for the base station as noted above).

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or other such configurations).

The methods, sequences, and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of non-transitory computer-readable medium known in the art. An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in a user device (e.g., a UE) or a base station. In the alternative, the processor and the non-transitory computer-readable medium may be discrete components in a user device or base station.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes CD, laser disc, optical disc, DVD, floppy disk, and Blu-ray discs, which usually reproduce data magnetically and/or optically with lasers. Combinations of the above should also be included within the scope of computer-readable media.

While the foregoing disclosure shows illustrative aspects, those skilled in the art will appreciate that various changes and modifications could be made herein without departing from the scope of the disclosure as defined by the appended claims. Furthermore, in accordance with the various illustrative aspects described herein, those skilled in the art will appreciate that the functions, steps, and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A method of operating a user equipment (UE), comprising:
    receiving, from a network entity, location assistance data that indicates (i) a set of antenna locations associated with at least one base station, the set of antenna locations including at least one antenna location of a base station, the at least one antenna location including a plurality of different antenna location coordinate values stored in one or more records associated with the base station, a single antenna location that is representative of multiple different antenna location coordinate values stored in at least one record associated with the base station, or a combination thereof, and (ii) a mapping of each of a plurality of beams to the at least one antenna location;
    receiving, from the base station, the plurality of beams in accordance with the mapping; and
    performing one or more measurements on one or more of the plurality of beams.

2. The method of claim 1, further comprising:
    estimating a position of the UE based at least in part upon (i) the one or more measurements performed by the UE on the one or more of the plurality of beams and (ii) the at least one antenna location to which the one or more beams are mapped.

3. The method of claim 1, wherein the at least one antenna location includes the plurality of different antenna location coordinate values.

4. The method of claim 3, further comprising:
    determining one or more antenna locations among the plurality of different antenna location coordinate values to which one or more beams among the plurality of beams are mapped,
    wherein the at least one antenna location used by the estimating corresponds to the determined one or more antenna locations.

5. The method of claim 4,
wherein the determining determines multiple candidate antenna locations to which at least one of the one or more beams is mapped,
wherein the estimating estimates multiple candidate position estimates of the UE based on the multiple candidate antenna locations, and derives the position estimate for the UE based on the multiple candidate position estimates.

6. The method of claim 5, wherein the deriving derives the position estimate based on the multiple candidate position estimates by:
(i) averaging of the multiple candidate position estimates, or
(ii) selecting the candidate position estimate that is most congruent with one or more previously estimated position estimates for the UE.

7. The method of claim 1, wherein the at least one antenna location includes the plurality of different antenna location coordinate values.

8. The method of claim 1, wherein the at least one antenna location includes the single representative antenna location of the multiple different antenna location coordinate values.

9. The method of claim 8, wherein the single representative antenna location is different than any of the multiple different antenna location coordinate values.

10. The method of claim 8, wherein the single representative antenna location is averaged between the multiple different antenna location coordinate values.

11. The method of claim 8, wherein the single representative antenna location is one of the multiple different antenna location coordinate values.

12. The method of claim 1,
wherein the network entity corresponds to a location server, or
wherein the network entity corresponds to the base station.

13. The method of claim 12, further comprising:
transmitting, to the network entity, a request for location information pertaining to the at least one base station,
wherein the location assistance data is received in response to the request.

14. The method of claim 13,
wherein the request further identifies beams being transmitted by the base station that are of interest to the UE, and
wherein the identified beams of interest correspond to the plurality of beams.

15. A method of operating a network entity, comprising:
determining location assistance data that indicates (i) a set of antenna locations associated with at least one base station, the set of antenna locations including at least one antenna location of a base station, the at least one antenna location including a plurality of different antenna location coordinate values stored in one or more records associated with the base station, a single antenna location that is representative of multiple different antenna location coordinate values stored in at least one record associated with the base station, or a combination thereof, and (ii) a mapping of each of a plurality of beams to the at least one antenna location; and
transmitting the location assistance data to a user equipment (UE).

16. The method of claim 15, further comprising:
receiving, from the UE, a request for location information pertaining to one or more base stations,
wherein the transmitting is performed in response to the request.

17. The method of claim 16,
wherein the request further identifies beams being transmitted by the base station that are of interest to the UE, further comprising:
configuring the location assistance data to only include antenna location information for the base station that is mapped to the identified beams of interest, such that the identified beams of interest correspond to the plurality of beams.

18. The method of claim 15, wherein the network entity corresponds to a location server.

19. The method of claim 18, wherein the network entity corresponds to the base station.

20. The method of claim 19, further comprising:
transmitting the plurality of beams from the at least one antenna location of the base station in accordance with the mapping.

21. The method of claim 15, wherein the at least one antenna location includes the plurality of different antenna location coordinate values.

22. The method of claim 15, wherein the at least one antenna location includes the single representative antenna location of the multiple different antenna location coordinate values.

23. The method of claim 22, wherein the single representative antenna location is different than any of the multiple different antenna location coordinate values.

24. The method of claim 23, wherein the single representative antenna location is averaged between the multiple different antenna location coordinate values.

25. The method of claim 22, wherein the single representative antenna location is one of the multiple different antenna location coordinate values.

26. A user equipment (UE), comprising:
a memory;
at least one transceiver; and
at least one processor coupled to the memory and the at least one transceiver configured to:
receive, from a network entity, location assistance data that indicates (i) a set of antenna locations associated with at least one base station, the set of antenna locations including at least one antenna location of a base station, the at least one antenna location including a plurality of different antenna location coordinate values stored in one or more records associated with the base station, a single antenna location that is representative of multiple different antenna location coordinate values stored in at least one record associated with the base station, or a combination thereof, and (ii) a mapping of each of a plurality of beams to the at least one antenna location; and
receive, from the base station, the plurality of beams in accordance with the mapping.

27. The UE of claim 26, wherein the at least one processor is further configured to:
estimate a position of the UE based at least in part upon (i) the one or more measurements performed by the UE on the one or more of the plurality of beams and (ii) the at least one antenna location to which the one or more beams are mapped.

28. The UE of claim 26, wherein the at least one antenna location includes the plurality of different antenna location coordinate values.

29. A network entity, comprising:
a memory;
at least one communication interface; and
at least one processor coupled to the memory and the at least one communication interface and configured to:
determine location assistance data that indicates (i) a set of antenna locations associated with at least one base station, the set of antenna locations including at least one antenna location of a base station, the at least one antenna location including a plurality of different antenna location coordinate values stored in one or more records associated with the base station, a single antenna location that is representative of multiple different antenna location coordinate values stored in at least one record associated with the base station, or a combination thereof, and (ii) a mapping of each of a plurality of beams to the at least one antenna location; and
transmit the location assistance data to a user equipment (UE).

30. The network entity of claim 29, wherein the at least one antenna location includes the plurality of different antenna location coordinate values.

* * * * *